United States Patent
Koike et al.

(10) Patent No.: US 10,522,820 B2
(45) Date of Patent: Dec. 31, 2019

(54) SECONDARY BATTERY-USE ACTIVE MATERIAL, SECONDARY BATTERY-USE ELECTRODE, SECONDARY BATTERY, ELECTRIC VEHICLE, AND ELECTRONIC APPARATUS

(71) Applicant: Murata Manufacturing Co., Ltd., Kyoto (JP)

(72) Inventors: Yosuke Koike, Kanagawa (JP); Takashige Fujikawa, Kanagawa (JP); Yoshinori Gamoh, Fukushima (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 128 days.

(21) Appl. No.: 15/520,438

(22) PCT Filed: Oct. 26, 2015

(86) PCT No.: PCT/JP2015/080055
§ 371 (c)(1),
(2) Date: Apr. 20, 2017

(87) PCT Pub. No.: WO2016/084531
PCT Pub. Date: Jun. 2, 2016

(65) Prior Publication Data
US 2017/0309892 A1    Oct. 26, 2017

(30) Foreign Application Priority Data
Nov. 27, 2014  (JP) ................................. 2014-240108

(51) Int. Cl.
*H01M 4/133* (2010.01)
*H01M 4/38* (2006.01)
(Continued)

(52) U.S. Cl.
CPC ............. *H01M 4/133* (2013.01); *B60L 50/14* (2019.02); *H01M 4/134* (2013.01); *H01M 4/366* (2013.01);
(Continued)

(58) Field of Classification Search
CPC ...... H01M 4/133; H01M 4/134; H01M 4/366; H01M 4/38; H01M 4/587; H01M 4/625; H01M 10/0525; H01M 4/386; B60L 50/14
See application file for complete search history.

(56) References Cited

U.S. PATENT DOCUMENTS

| | | | |
|---|---|---|---|
| 6,230,496 B1 * | 5/2001 | Hofmann | B60K 6/105 60/706 |
| 9,882,238 B2 * | 1/2018 | He | H01M 10/056 |
| 10,044,067 B2 * | 8/2018 | Iwama | H01M 4/133 |

FOREIGN PATENT DOCUMENTS

| | | |
|---|---|---|
| JP | 05-335017 A | 12/1993 |
| JP | 2000-188095 A | 7/2000 |

(Continued)

OTHER PUBLICATIONS

Office Action for JP Patent Application No. 2014-240108, dated Jun. 19, 2018, 03 pages of Office Action and 04 pages of English Translation.

(Continued)

Primary Examiner — Helen Oi K Conley
(74) Attorney, Agent, or Firm — Chip Law Group

(57) ABSTRACT

A secondary battery includes a cathode; an anode (1) including a plurality of carbon particles and a plurality of non-carbon particles, (2) the carbon particles containing graphite, (3) the non-carbon particles containing a material including, as a constituent element, one or more of silicon (Si), tin (Sn), and germanium (Ge), and (4) a distribution of a first-order differential value of an integrated value Q of a relative (Continued)

particle amount with respect to a particle diameter D of the plurality of carbon particles having one or more discontinuities, where a horizontal axis and a vertical axis of the distribution indicate the particle diameter D (μm) and a first-order differential value dQ/dD, respectively; and an electrolyte.

12 Claims, 9 Drawing Sheets

(51) Int. Cl.
H01M 4/587 (2010.01)
H01M 10/0525 (2010.01)
H01M 4/134 (2010.01)
H01M 4/36 (2006.01)
H01M 4/62 (2006.01)
B60L 50/14 (2019.01)

(52) U.S. Cl.
CPC ............ *H01M 4/38* (2013.01); *H01M 4/587* (2013.01); *H01M 4/625* (2013.01); *H01M 10/0525* (2013.01); *H01M 4/386* (2013.01); *H01M 4/387* (2013.01); *Y02E 60/122* (2013.01); *Y02T 10/7011* (2013.01)

(56) References Cited

FOREIGN PATENT DOCUMENTS

| JP | 2002-151055 A | 5/2002 |
|---|---|---|
| JP | 2003-123740 A | 4/2003 |
| JP | 2003-123740 A | 3/2004 |
| JP | 3609612 B2 | 1/2005 |
| JP | 2006-164952 A | 6/2006 |
| JP | 2008-140809 A | 6/2008 |
| JP | 2009-289417 A | 12/2009 |
| JP | 2011-054559 A | 3/2011 |
| JP | 4854289 B2 | 1/2012 |
| JP | 5046302 B2 | 10/2012 |
| JP | 2014-503942 A | 2/2014 |
| JP | 2014-503972 A | 2/2014 |

OTHER PUBLICATIONS

Office Action for JP Patent Application No. 2014-240108, dated Jan. 29, 2019, 04 pages of Office Action and 03 pages of English Translation.

Office Action for CN Patent Application No. 201580057059.7, dated Jun. 3, 2019, 3 pages of Office Action and 5 pages of English Translation.

* cited by examiner

[FIG. 1]
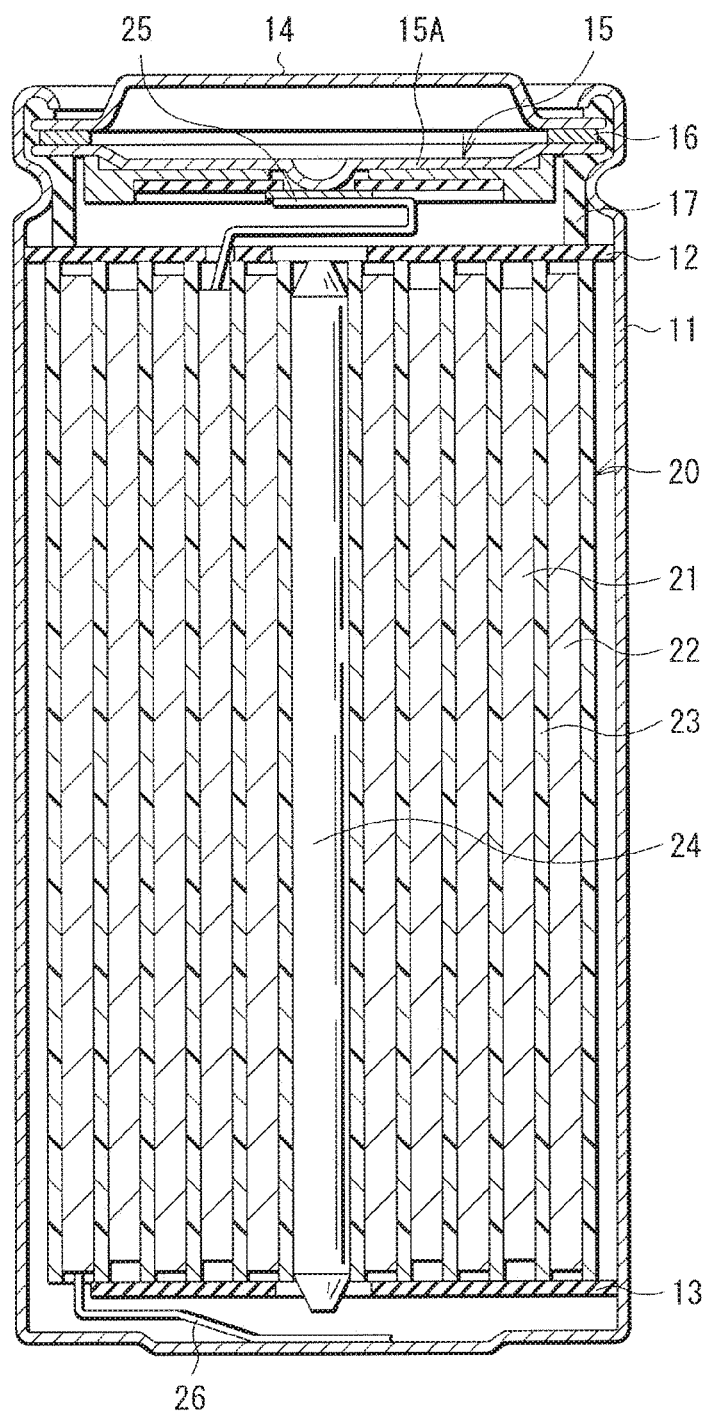

[ FIG. 2 ]
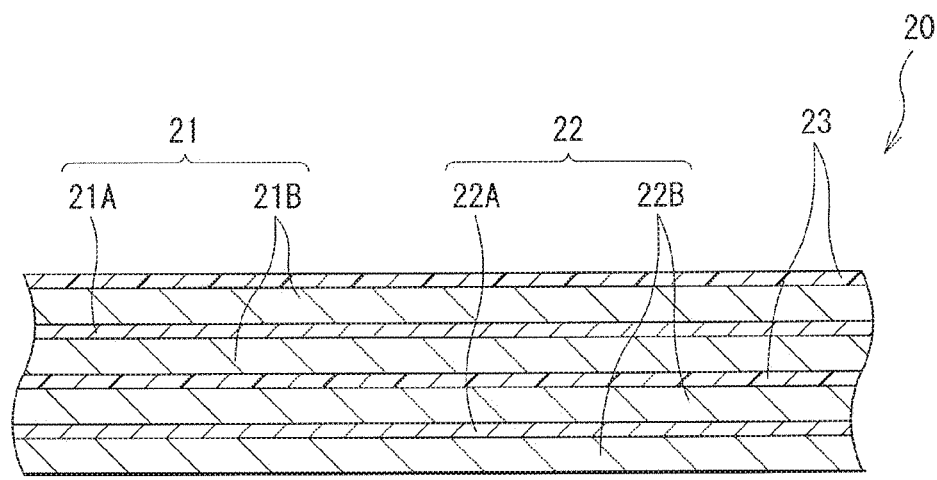

[FIG.3]
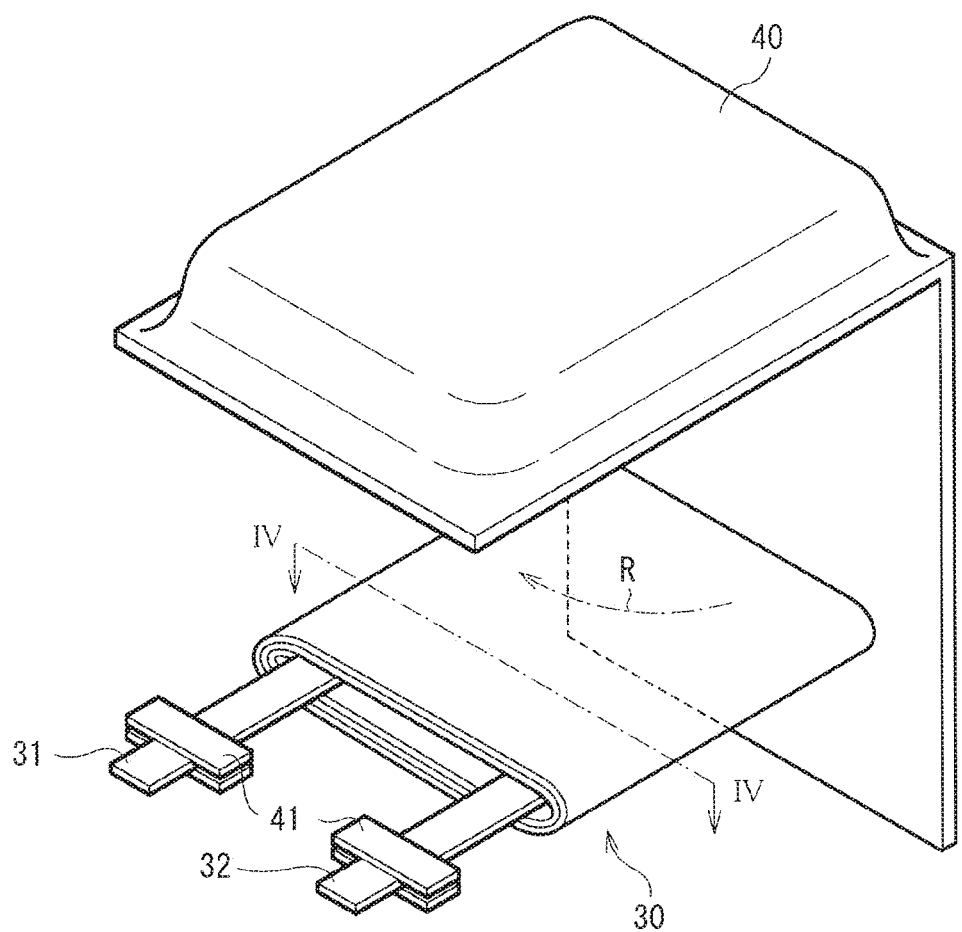

[ FIG. 4 ]
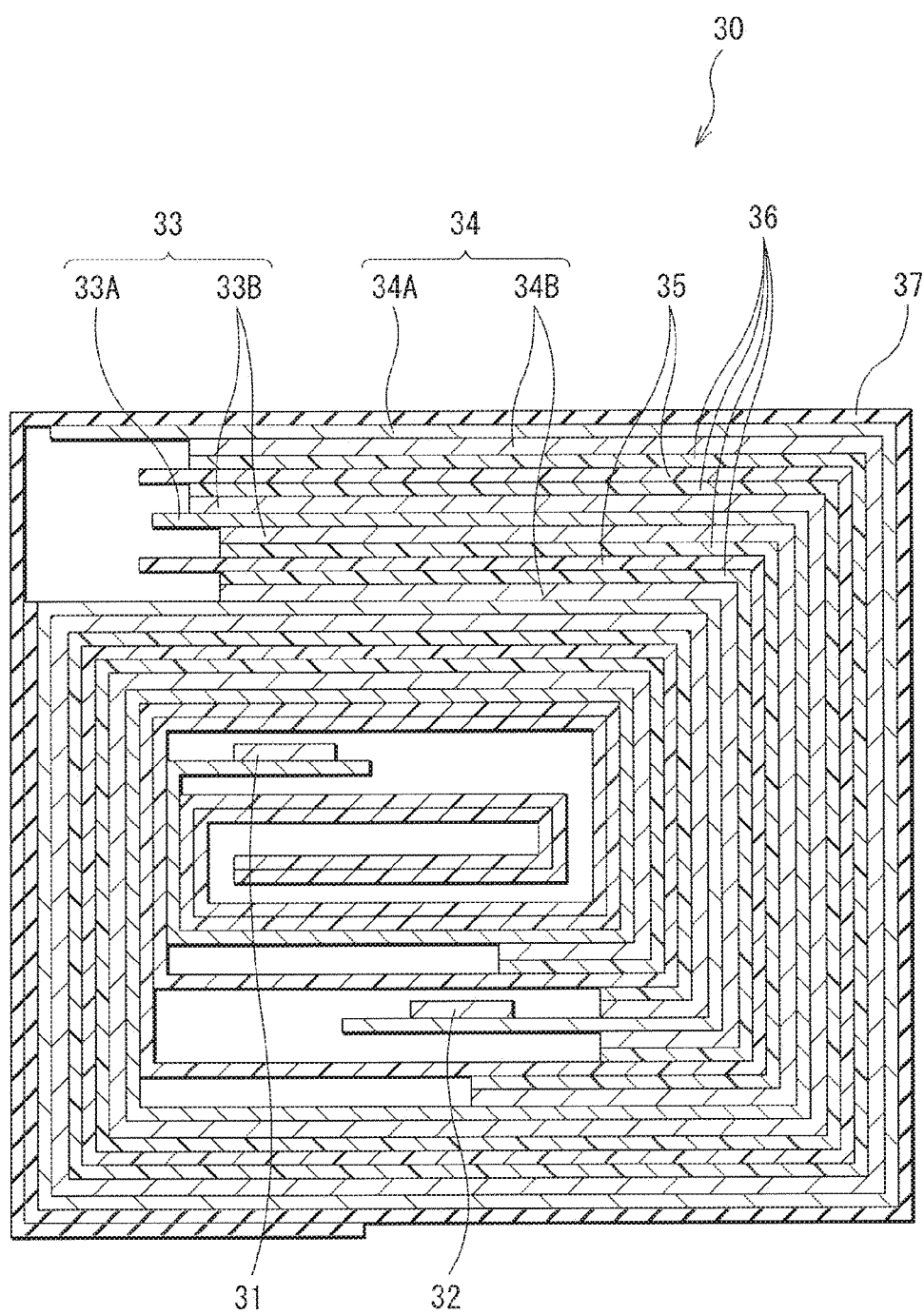

[FIG. 5]
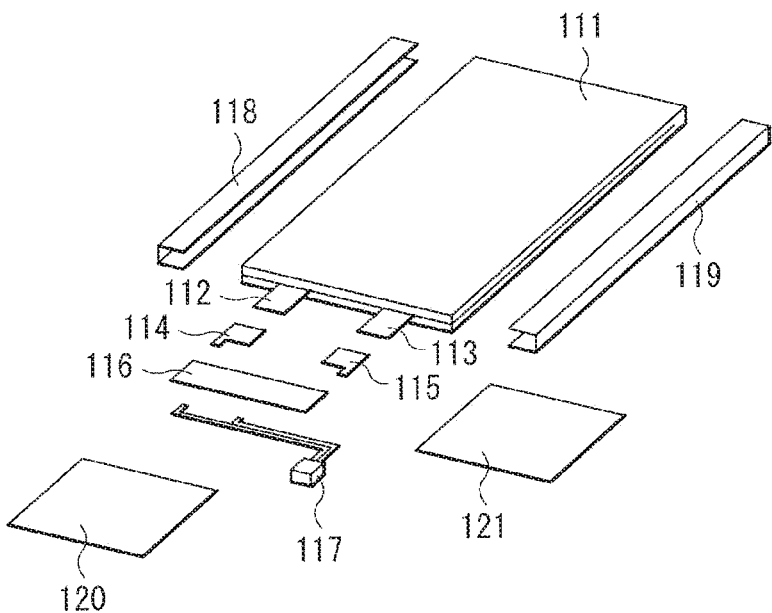
[FIG. 6]
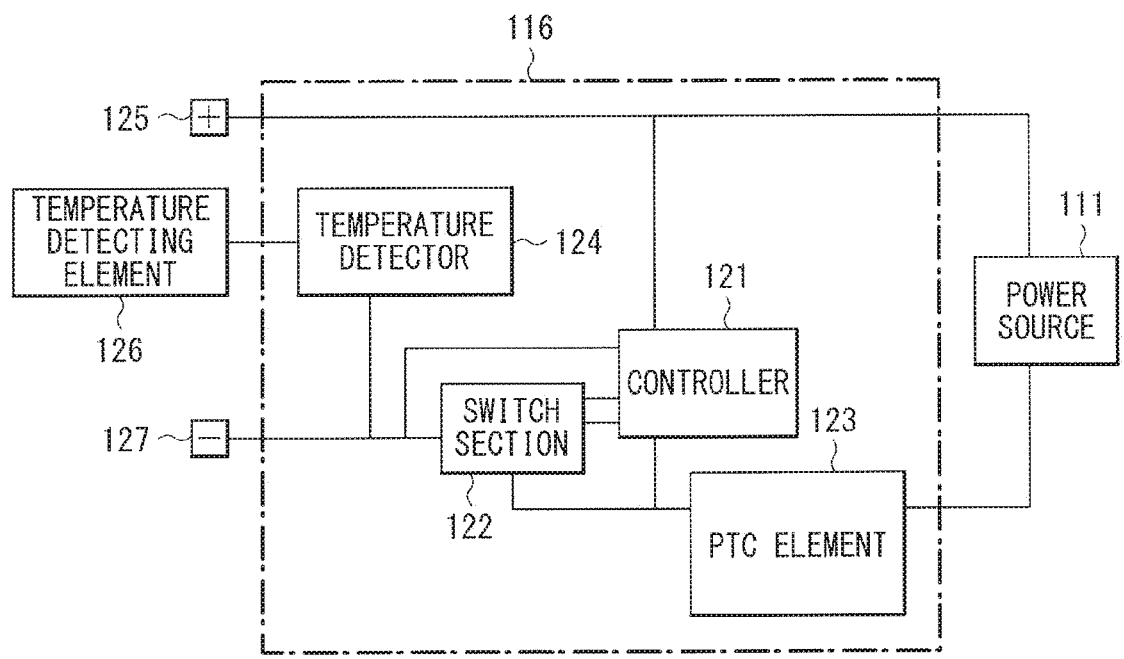

[ FIG. 7 ]
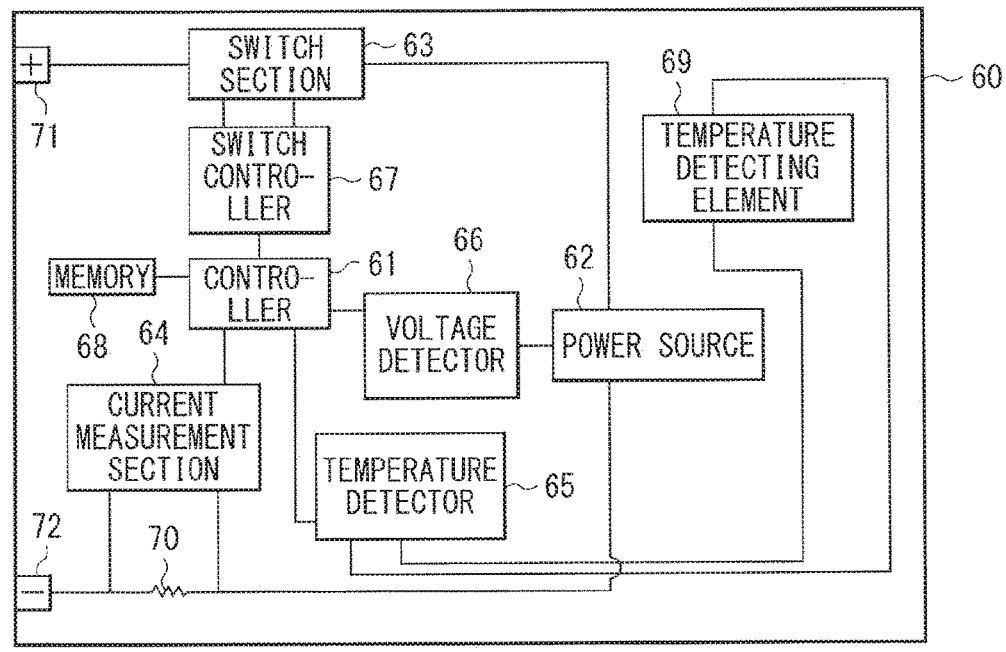
[ FIG. 8 ]
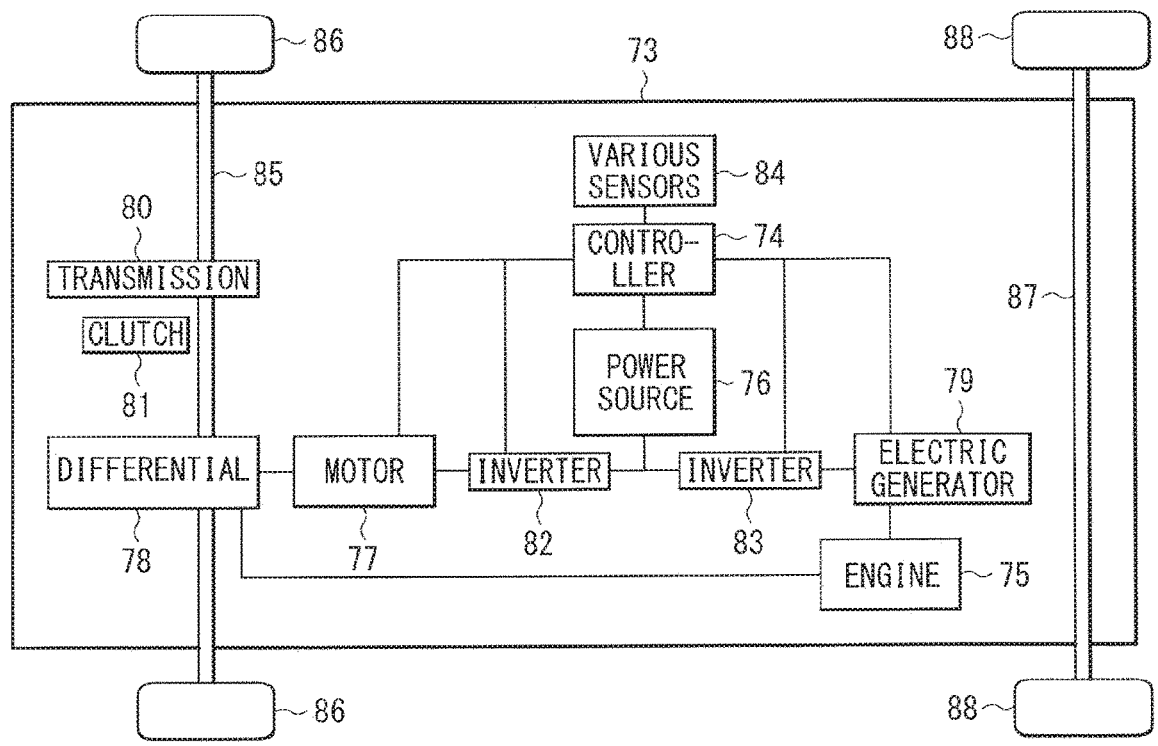

[ FIG. 9 ]
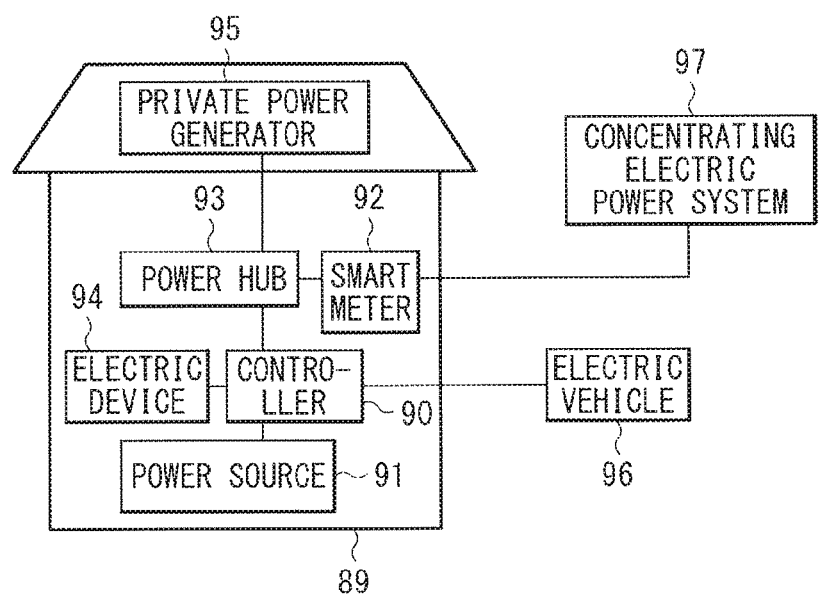
[ FIG. 10 ]
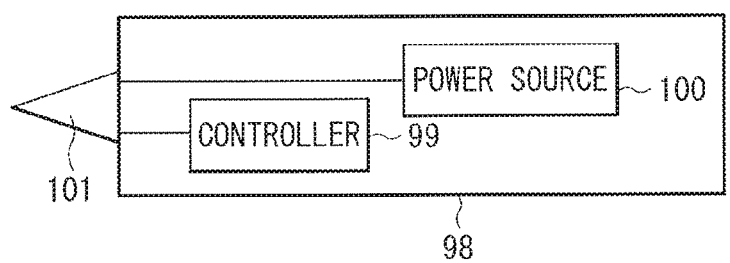

[ FIG. 11 ]
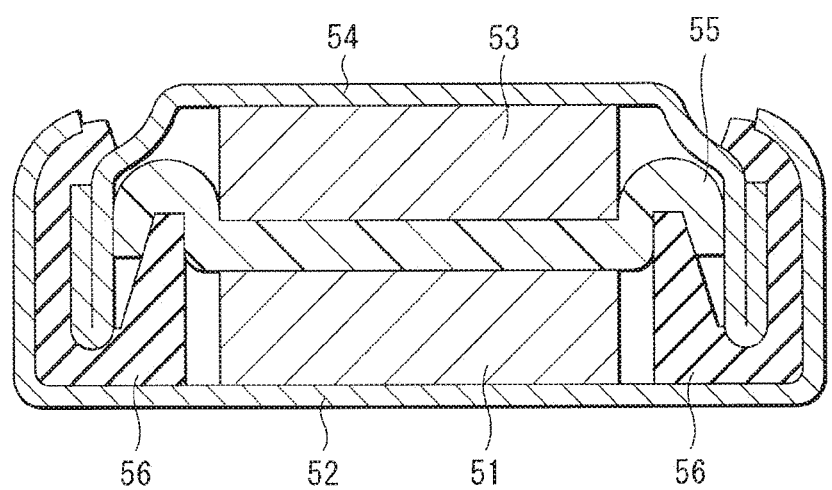
[ FIG. 12 ]
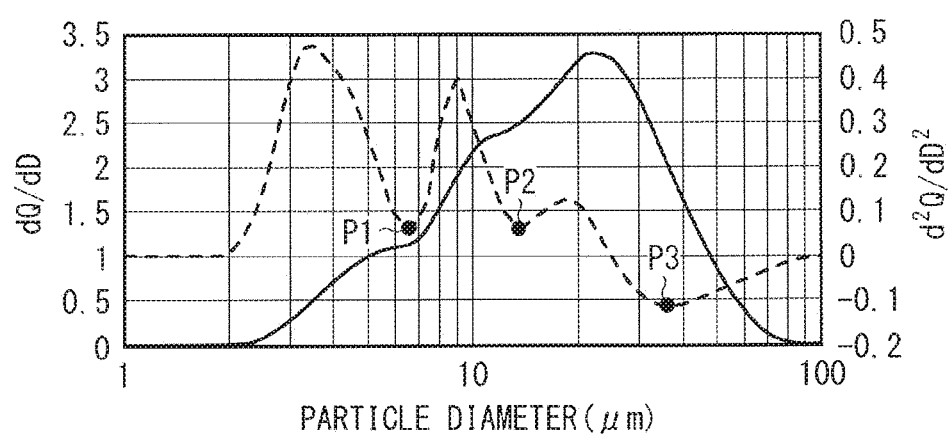

[ FIG. 13 ]
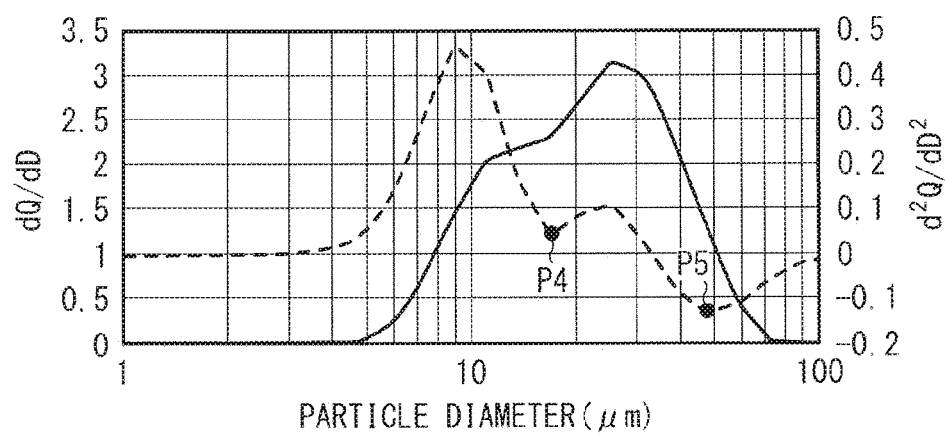
[ FIG. 14 ]
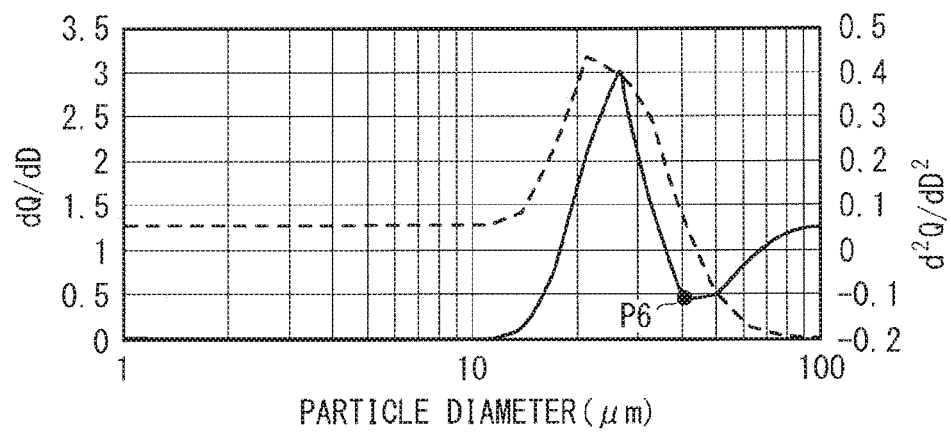

SECONDARY BATTERY-USE ACTIVE MATERIAL, SECONDARY BATTERY-USE ELECTRODE, SECONDARY BATTERY, ELECTRIC VEHICLE, AND ELECTRONIC APPARATUS

CROSS REFERENCE TO RELATED APPLICATIONS

This application is a U.S. National Phase of International Patent Application No. PCT/JP2015/080055 filed on Oct. 26, 2015, which claims priority benefit of Japanese Patent Application No. JP 2014-240108 filed in the Japan Patent Office on Nov. 27, 2014. Each of the above-referenced applications is hereby incorporated herein by reference in its entirety.

TECHNICAL FIELD

The present technology relates to a secondary battery-use active material and a secondary battery-use electrode each of which includes a plurality of carbon particles and a plurality of non-carbon particles, a secondary battery that uses the secondary battery-use electrode, and an electric vehicle and an electronic apparatus each of which uses the secondary battery.

BACKGROUND ART

Various electronic apparatuses such as mobile phones and personal digital assistants (PDAs) have been widely used, and it has been demanded to further reduce size and weight of the electronic apparatuses and to achieve their longer lives. Accordingly, batteries, in particular, small and light-weight secondary batteries that have ability to achieve high energy density have been developed as power sources for the electronic apparatuses.

Applications of the secondary batteries are not limited to the electronic apparatuses described above, and it has been also considered to apply the secondary batteries to various other applications. Examples of such other applications may include: a battery pack attachably and detachably mounted on, for example, an electronic apparatus; an electric vehicle such as an electric automobile; an electric power storage system such as a home electric power server; and an electric power tool such as an electric drill.

There have been proposed secondary batteries that utilize various charge and discharge principles in order to obtain battery capacity. In particular, attention has been paid to a secondary battery that utilizes insertion and extraction of an electrode reactant and a secondary battery that utilizes precipitation and dissolution of an electrode reactant, which make it possible to achieve higher energy density than other batteries such as a lead-acid battery and a nickel-cadmium battery.

The secondary battery includes a cathode, an anode, and an electrolyte. The anode contains an anode active material participating in charge-discharge reaction. The configuration of the anode active material exerts a large influence on battery characteristics. Accordingly, various studies have been conducted on the configuration of the anode active material.

More specifically, in order to achieve high safety, a particle size distribution (such as a 10% cumulative diameter and a 50% cumulative diameter) of a non-graphitizable carbon material is made appropriate (for example, refer to PTL 1). In order to achieve superior charge-discharge cycle characteristics and superior heavy-load discharge characteristics, a surface of a compound containing Si and O as constituent elements is coated with carbon (for example, refer to PTL 2). In order to achieve high discharge capacity and superior cycle characteristics, for example, an oxide of silicon and a carbon material are used in combination (for example, refer to PTL 3). In order to achieve high capacity and superior cycle characteristics, an alloyed material and a carbon material are used in combination, and a ratio of the alloyed material and the carbon material and average particle diameters of the alloyed material and the carbon material are made appropriate (for example, refer to PTL 4). For a similar purpose, an alloy material and a carbon material are used in combination, and average particle diameters of the alloy material and the carbon material are made appropriate (for example, refer to PTL 5).

CITATION LIST

Patent Literature

PTL 1: Japanese Unexamined Patent Application Publication No. H05-335017
PTL 2: Japanese Patent No. 4854289
PTL 3: Japanese Patent No. 3609612
PTL 4: Japanese Patent No. 5046302
PTL 5: Japanese Unexamined Patent Application Publication No. 2006-164952

SUMMARY OF THE INVENTION

Electronic apparatuses and other apparatuses described above are more frequently used in association with higher performance and more multi-functionality thereof. Accordingly, secondary batteries tend to be frequently charged and discharged. For this reason, there is still room for improvement in battery characteristics of the secondary batteries.

It is therefore desirable to provide a secondary battery-use active material, a secondary battery-use electrode, a secondary battery, an electric vehicle, and an electronic apparatus each of which makes it possible to achieve superior battery characteristics.

A secondary battery-use active material and a secondary battery-use electrode according to respective embodiments of the present technology includes: (1) a plurality of carbon particles and a plurality of non-carbon particles, (2) the carbon particles containing graphite, (3) the non-carbon particles containing a material including, as a constituent element, one or more of silicon (Si), tin (Sn), and germanium (Ge), and (4) a distribution of a first-order differential value of an integrated value Q of a relative particle amount with respect to a particle diameter D of the plurality of carbon particles having one or more discontinuities, where a horizontal axis and a vertical axis of the distribution indicate the particle diameter D ($\mu$m) and a first-order differential value dQ/dD, respectively.

A secondary battery according to an embodiment of the present technology includes: a cathode; an anode; and an electrolyte, and the anode has a similar configuration to that of the secondary battery-use electrode according to the foregoing embodiment of the present technology.

An electric vehicle and an electronic apparatus according to respective embodiments of the present technology each include a secondary battery, and the secondary battery has a similar configuration to that of the secondary battery according to the foregoing embodiment of the present technology.

The foregoing "first-order differential value of the integrated value Q of the relative particle amount" may be obtained by obtaining an integrated particle size distribution, i.e., a distribution of the integrated value Q (%) of the relative particle amount (volumetric basis) with respect to the particle diameter D (μm) by, for example, particle diameter distribution measurement apparatus (or a particle size distribution measurement apparatus), where a horizontal axis indicates the particle diameter D (μm) and a vertical axis indicates the integrated value Q (%) of the relative particle amount, and thereafter subjecting integrated values Q of a plurality of relative particle amounts forming the distribution to first-order differentiation. Accordingly, the foregoing "distribution of the first-order differential value of the integrated value Q of the relative particle amount with respect to the particle diameter D" is a graph where a first-order differential value for each particle diameter D is plotted, and the "distribution" is formed by a plurality of first-order differential values. A specific example of the particle diameter distribution measurement apparatus may be a particle diameter distribution measurement apparatus SALD-7100 manufactured by Shimadzu Corporation. During measurement, for example, a sample (a plurality of carbon particles) are dispersed in a sodium hexametaphosphate solution (0.2 wt %), and a refractive index is set to 1.60-0.50 i. In order to subject the integrated value Q to first-order differentiation, for example, the integrated value Q may be subjected to a computation (differentiation) process with use of calculation software. In this case, for example, the differentiation process may be performed with use of three integrated values Q (a median value and values above and below the median value) for each differentiation process. Specific examples of the calculation software may include spreadsheet software such as Excel (Registered Trademark).

The "discontinuity" is an inflection point appearing in the foregoing distribution of the first-order differential value of the integrated value Q of the relative particle amount with respect to the particle diameter D. However, the discontinuity described here is defined as one or more points to become a minimal value (a positive value) in a distribution of a second-order differential value of the integrated value Q of the relative particle amount with respect to the particle diameter D of the plurality of carbon particles, where a horizontal axis indicates the particle diameter D (μm) and a vertical axis indicates a second-order differential value $d^2Q/dD^2$. The "second-order differential value of the integrated value Q of the relative particle amount" is obtained by subjecting the integrated values Q of the plurality of relative particle amounts to differentiation twice by the above-described procedure. It is to be noted that in order to determine presence or absence of the discontinuity, the distribution of the second-order differential value of the integrated value Q of the relative particle amount with respect to the particle diameter D is used, because there is a possibility that it is difficult to specify the inflection point when the distribution of the first-order differential value of the integrated value Q of the relative particle amount with respect to the particle diameter D is used. As described above, in the distribution of the second-order differential value of the integrated value Q of the relative particle amount with respect to the particle diameter D, one or more minimal values may appear; however, the discontinuity described here is a minimal value to become a positive value out of the one or more minimal values. Accordingly, a minimal value to become a negative value does not correspond to the discontinuity.

According to the secondary battery-use active material, the secondary battery-use electrode, and the secondary battery according to the respective embodiments of the present technology, the plurality of carbon particles containing graphite and the plurality of non-carbon particles containing a material including a constituent element such as silicon are included, and the foregoing distribution of the first-order differential value of the integrated value Q of the relative particle amount with respect to the particle diameter D has one or more discontinuities. This makes it possible to achieve superior battery characteristics. Moreover, in the electric vehicle and the electronic apparatus of the respective embodiments of the present technology, similar effects are achievable.

Note that effects described here are non-limiting. Effects achieved by the present technology may be one or more of effects described in the present technology.

BRIEF DESCRIPTION OF THE DRAWINGS

FIG. 1 is a cross-sectional view of a configuration of a secondary battery (cylindrical type) according to an embodiment of the present technology.

FIG. 2 is a cross-sectional view of part of a spirally wound electrode body illustrated in FIG. 1.

FIG. 3 is a perspective view of a configuration of another secondary battery (laminated film type) according to the embodiment of the present technology.

FIG. 4 is a cross-sectional view taken along a line IV-IV of a spirally wound electrode body illustrated in FIG. 3.

FIG. 5 is a perspective view of a configuration of an application example (a battery pack: single battery) of the secondary battery.

FIG. 6 is a block diagram illustrating a configuration of the battery pack illustrated in FIG. 5.

FIG. 7 is a block diagram illustrating a configuration of an application example (a battery pack: assembled battery) of the secondary battery.

FIG. 8 is a block diagram illustrating a configuration of an application example (an electric vehicle) of the secondary battery.

FIG. 9 is a block diagram illustrating a configuration of an application example (an electric power storage system) of the secondary battery.

FIG. 10 is a block diagram illustrating a configuration of an application example (an electric power tool) of the secondary battery.

FIG. 11 is a cross-sectional view of a configuration of a test-use secondary battery (coin type).

FIG. 12 is a diagram illustrating a first-order differential distribution and a second-order differential distribution relating to an experimental example 1-1.

FIG. 13 is a diagram illustrating a first-order differential distribution and a second-order differential distribution relating to an experimental example 2-4.

FIG. 14 is a diagram illustrating a first-order differential distribution and a second-order differential distribution relating to an experimental example 1-16.

MODES FOR CARRYING OUT THE INVENTION

In the following, some embodiments of the present technology are described in detail with reference to the drawings. It is to be noted that description is given in the following order.

1. Secondary Battery-Use Active Material
2. Secondary Battery-Use Electrode and Secondary Battery Using Secondary Battery-Use Active Material
   2-1. Lithium-Ion Secondary Battery
      2-1-1. Cylindrical Type
      2-1-2. Laminated Film Type
   2-2. Lithium Metal Secondary Battery
3. Applications of Secondary Battery
   3-1. Battery Pack (Single Battery)
   3-2. Battery Pack (Assembled Battery)
   3-3. Electric Vehicle
   3-4. Electric Power Storage System
   3-5. Electric Power Tool <1. Secondary Battery-Use Active Material>

First, description is given of a secondary battery-use active material according to the present technology. Hereinafter, the secondary battery-use active material is simply referred to as "active material" or "active material of the present technology".

The active material described here may be used for, for example, a secondary battery such as a lithium-ion secondary battery. However, the secondary battery using the active material is not limited to the lithium-ion secondary battery, and may be any other secondary battery. It is to be noted that the active material may be used as a cathode active material or an anode active material.

[Whole Configuration of Active Material]

The active material includes a plurality of carbon particles and a plurality of non-carbon particles. The "carbon particles" are particles containing carbon (C) as a main constituent element, and a content of carbon in the carbon particles is 90% or more in atomic ratio. In contrast, the "non-carbon particles" are particles not containing carbon as a main constituent element, more specifically, particles containing, as a main constituent element, one or more of elements other than carbon. The non-carbon particles may contain carbon as a constituent element, but a content of carbon in the non-carbon particles is less than 50% in atomic ratio.

The carbon particles may contain one or more kinds of graphite. In other words, one or more of the plurality of carbon particles may be graphite particles.

The kind of graphite is not particularly limited. More specifically, the kind of graphite may be, for example, one or both of natural graphite and artificial graphite. Moreover, a shape of the carbon material may be, for example, one or more of a fibrous shape, a spherical shape, a granular shape, and a scale-like shape. It is to be noted that a surface of graphite may be coated with or partially modified with, for example, one or more of pitches and resins.

The natural graphite may be, for example, one or more of crystalline flake graphite, crystalline vein graphite, and amorphous graphite. The artificial graphite may be, for example, one or more of mesocarbon microbeads (MCMBs).

The non-carbon particles may contain one or more of metal-based materials. The "metal-based material" is a material containing, as a constituent element, one or more of elements (hereinafter referred to as "reactive elements") that are able to react with an electrode reactant. However, carbon is excluded from the reactive element described here. The kind of the reactive element is not particularly limited, but specific examples of the reactive element may include one or more of elements such as silicon, tin, and germanium.

The "electrode reactant" is a material used for electrode reaction (charge-discharge reaction) in a secondary battery using the active material. The electrode reactant may be, for example, lithium (Li) in a lithium-ion secondary battery.

Since the metal-based material is a material containing, as a constituent element, one or more of reactive elements as described above, the metal-based material may be any of a simple substance, an alloy, or a compound, or may be two or more thereof. In other words, the metal-based material may be one or more of a simple substance, an alloy, and a compound of silicon. Moreover, the metal-based material may be one or more of a simple substance, an alloy, and a compound of tin. Further, the metal-based material may be one or more of a simple substance, an alloy, and a compound of germanium. It goes without saying that the metal-based material may be two or more of the metal-based materials mentioned above.

In particular, the metal-based material may be preferably a material containing one or both of silicon and tin as constituent elements, and more preferably a material containing silicon as a constituent element. This makes it possible to achieve high energy density.

Details of the alloy of silicon and the compound of silicon are as described below.

The alloy of silicon may contain, for example, one or more of elements such as tin, nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr), as constituent elements other than silicon. The compound of silicon may contain, for example, one or more of elements such as carbon and oxygen (O), as constituent elements other than silicon. It is to be noted that the compound of silicon may contain, for example, one or more of the elements described related to the alloy of silicon, as constituent elements other than silicon.

Specific examples of the alloy of silicon and the compound of silicon may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), and LiSiO. It is to be noted that "v" in $SiO_v$ may be, for example, in a range of $0.2<v<1.4$. Note that the alloy of silicon may be coated with or partially modified with, for example, one or more of low-crystalline carbon, high-crystalline carbon, and graphite with use of one or more of methods such as a liquid-phase method, a vapor-phase method, and a solid-phase method. The compound of silicon may be coated or partially modified in a similar manner.

Details of the alloy of germanium and the compound of germanium are similar to the details of the alloy of silicon and the compound of silicon mentioned above, except that germanium is used in place of silicon and constituent elements other than germanium include silicon. Specific examples of the alloy of germanium and the compound of germanium may include $GeO_w$ ($0<w\leq2$).

Details of the alloy of tin and the compound of tin are similar to the details of the alloy of silicon and the compound of silicon mentioned above, except that tin is used in place of silicon and constituent elements other than tin include silicon. Specific examples of the alloy of tin and the compound of tin may include $SnO_x$ ($0<x\leq2$), $SnSiO_3$, LiSnO, and $Mg_2Sn$.

The alloy of tin and the compound of tin encompass a material to be described below. The material may be, for example, a material (Sn-containing material) containing, together with tin as a first constituent element, a second constituent element and a third constituent element. The second constituent element may be, for example, one or more of elements such as cobalt (Co), iron (Fe), magnesium (Mg), titanium (Ti), vanadium (V), chromium (Cr), manganese (Mn), nickel (Ni), copper (Cu), zinc (Zn), gallium (Ga), zirconium (Zr), niobium (Nb), molybdenum (Mo), silver (Ag), indium (In), cesium (Ce), hafnium (Hf), tantalum (Ta), tungsten (W), bismuth (Bi), and silicon (Si). The third constituent element may be, for example, one or more of elements such as boron (B), carbon (C), aluminum (Al), and phosphorus (P).

In particular, the Sn-containing material may be preferably a material (a SnCoC-containing material) that contains tin, cobalt, and carbon as constituent elements. In the SnCoC-containing material, for example, a content of carbon may be from 9.9 mass % to 29.7 mass % both inclusive, and a ratio of contents of tin and cobalt (Co/(Sn+Co)) may be from 20 mass % to 70 mass % both inclusive. This makes it possible to achieve high energy density.

The SnCoC-containing material may preferably have a phase that contains tin, cobalt, and carbon. Such a phase may be preferably low crystalline or amorphous. This phase is a phase (a reaction phase) that is able to react with the electrode reactant. Hence, existence of the reaction phase results in achievement of superior characteristics. A half width (a diffraction angle 2θ) of a diffraction peak obtained by X-ray diffraction of this reaction phase may be preferably 1° or larger in a case in which a CuKα ray is used as a specific X-ray, and an insertion rate is 1°/min. This makes it possible to insert and extract the electrode reactant more smoothly, and to decrease reactivity with an electrolyte. It is to be noted that, in some cases, the SnCoC-containing material may include a phase that contains simple substances of the respective constituent elements or part thereof in addition to the low-crystalline phase or the amorphous phase.

Comparison between X-ray diffraction charts before and after an electrochemical reaction with the electrode reactant makes it possible to easily determine whether the diffraction peak obtained by the X-ray diffraction corresponds to the phase (reaction phase) that is able to react with the electrode reactant. For example, if a position of the diffraction peak after the electrochemical reaction with the electrode reactant is changed from the position of the diffraction peak before the electrochemical reaction with the electrode reactant, the obtained diffraction peak corresponds to the reaction phase that is able to react with the electrode reactant. In this case, for example, the diffraction peak of the low-crystalline reaction phase or the amorphous reaction phase is seen in a range of 2θ that is from 20° to 50° both inclusive. Such a reaction phase may include, for example, the respective constituent elements mentioned above, and it may be considered that such a reaction phase has become low crystalline or amorphous mainly because of existence of carbon.

In the SnCoC-containing material, part or all of carbon that is the constituent element thereof may be preferably bound to one or both of a metal element and a metalloid element that are other constituent elements thereof. Binding part or all of carbon suppresses cohesion or crystallization of, for example, tin. It is possible to confirm a binding state of the elements, for example, by X-ray photoelectron spectroscopy (XPS). In a commercially-available apparatus, for example, an Al-Kα ray or a Mg-Kα ray may be used as a soft X-ray. In a case in which part or all of carbon is bound to one or both of the metal element and the metalloid element, a peak of a synthetic wave of is orbit of carbon (C1s) appears in a region lower than 284.5 eV. It is to be noted that energy calibration is so made that a peak of 4f orbit of a gold atom (Au4f) is obtained at 84.0 eV. In this case, in general, surface contamination carbon exists on the material surface. Hence, a peak of C1s of the surface contamination carbon is regarded to be at 284.8 eV, and this peak is used as energy standard. In XPS measurement, a waveform of the peak of C1s is obtained as a form that includes the peak of the surface contamination carbon and the peak of the carbon in the SnCoC-containing material. The two peaks may be therefore separated from each other, for example, by analysis with use of commercially-available software. In the analysis of the waveform, a position of the main peak that exists on the lowest bound energy side is regarded as the energy standard (284.8 eV).

The SnCoC-containing material is not limited to a material (SnCoC) that contains only tin, cobalt, and carbon as constituent elements. The SnCoC-containing material may further contain, for example, one or more of elements such as silicon, iron, nickel, chromium, indium, niobium, germanium, titanium, molybdenum, aluminum, phosphorus, gallium, and bismuth, as constituent elements, in addition to tin, cobalt, and carbon.

Other than the SnCoC-containing material, a material (a SnCoFeC-containing material) that contains tin, cobalt, iron, and carbon as constituent elements may be also preferable. Any composition of the SnCoFeC-containing material may be adopted. To give an example, in a case where a content of iron is set smaller, a content of carbon may be from 9.9 mass % to 29.7 mass % both inclusive, a content of iron may be from 0.3 mass % to 5.9 mass % both inclusive, and a ratio of contents of tin and cobalt (Co/(Sn+Co)) may be from 30 mass % to 70 mass % both inclusive. Alternatively, in a case where the content of iron is set larger, the content of carbon may be from 11.9 mass % to 29.7 mass % both inclusive, the ratio of contents of tin, cobalt, and iron ((Co+Fe)/(Sn+Co+Fe)) may be from 26.4 mass % to 48.5 mass % both inclusive, and the ratio of contents of cobalt and iron (Co/(Co+Fe)) may be from 9.9 mass % to 79.5 mass % both inclusive. Such composition ranges allow for achievement of high energy density. It is to be noted that physical characteristics (such as a half width) of the SnCoFeC-containing material are similar to physical characteristics of the foregoing SnCoC-containing material.

It is to be noted that the active material may further contain one or more of other particles.

The other particles may be, for example, one or more of particles such as particles of a metal oxide and particles of a polymer compound. Note that the metal-based material is excluded from the metal oxide described here. Examples of the metal oxide may include iron oxide, ruthenium oxide, and molybdenum oxide. Examples of the polymer compound may include polyacetylene, polyaniline, and polypyrrole. Note that the other particles may be particles other than the particles mentioned above.

[Specific Configuration of Active Material]

In a case in which the plurality of carbon particles and the plurality of non-carbon particles are used in combination, in order to achieve superior battery characteristics, a particle size distribution of the plurality of carbon particles is made appropriate so as to exhibit a characteristic distribution.

More specifically, when the plurality of carbon particles are used to obtain a distribution of a first-order differential value of an integral value Q of a relative particle amount with respect to a particle diameter D of the plurality of carbon particles, the distribution has one or more discontinuities. In the distribution, a horizontal axis indicates the particle diameter D (μm), and a vertical axis indicates a first-order differential value dQ/dD. Hereinafter, the distribution of the first-order differential value of the integrated value Q of the relative particle amount with respect to the particle diameter D is referred to as "first-order differential distribution".

The first-order differential distribution is a distribution obtained by obtaining an integrated particle size distribution, i.e., a distribution of the integrated value Q of the relative particle amount with respect to the particle diameter D (μm), where a horizontal axis indicates the particle diameter D (μm) and a vertical axis indicates the integrated value Q (%) of the relative particle amount, and thereafter subjecting integrated values Q of a plurality of relative particle amounts forming the distribution to first-order differentiation, as described above. In order to obtain the distribution of the integrated value Q of the relative particle amount with respect to the particle diameter D, for example, the plurality of carbon particles may be analyzed with use of a particle diameter distribution measurement apparatus (SALD-7100 manufactured by Shimadzu Corporation). In order to subject the integrated value Q to first-order differentiation, for example, as described above, the integrated value Q may be subjected to a computation (differentiation) process with use of calculation software such as Excel (Registered Trademark), and three integrated values Q (a median value and values above and below the median value) may be used for each differentiation process.

The discontinuity is an inflection point appearing in the first-order differential distribution, as described above. However, the discontinuity described here is defined as one or more points to become a minimal value (a positive value) in a distribution of a second-order differential value of the integrated value Q of the relative particle amount with respect to the particle diameter D of the plurality of carbon particles, where a horizontal axis indicates the particle diameter D (μm) and a vertical axis indicates a second-order differential value $d^2Q/dD^2$. The second-order differential value of the integrated value Q of the relative particle amount is obtained by subjecting the integrated values Q of the plurality of relative particle amounts to differentiation twice by the foregoing procedure. It is to be noted that in order to determine presence or absence of the discontinuity, the distribution of the second-order differential value of the integrated value Q of the relative particle amount with respect to the particle diameter D is used, because there is a possibility that it is difficult to specify the inflection point when the distribution of the first-order differential value of the integrated value Q of the relative particle amount with respect to the particle diameter D is used. As described above, in the distribution of the second-order differential value of the integrated value Q of the relative particle amount with respect to the particle diameter D, one or more minimal values may appear; however, the discontinuity described here is a minimal value to become a positive value out of the one or more minimal values. Accordingly, a minimal value to become a negative value does not correspond to the discontinuity. A method of determining the presence or absence of the discontinuity is described in detail in examples to be described later. Hereinafter, the distribution of the second-order differential value of the integrated value Q of the relative particle amount with respect to the particle diameter D is referred to as "second-order differential distribution".

The first-order differential distribution has one or more discontinuities, which means that a plurality of graphite particles of two or more kinds having different average particle diameters from each other are contained in the plurality of carbon particles. The average particle diameter described here indicates a so-called median diameter D50 (μm), and this also applies to the following description.

More specifically, in a case in which only one kind of graphites particles having a predetermined (optional) average particle diameter are used as the plurality of carbon particles, no inflection point appears in the first-order differential distribution, which means that the first-order differential distribution has no discontinuity.

In contrast, in a case in which two or more kinds of graphite particles having two or more average particle diameters are used, one or more inflection points appear in the first-order differential distribution, which means that the first-order differential distribution has one or more discontinuities.

The first-order differential distribution relating to the plurality of carbon particles has one or more discontinuities. In other words, as described above, the plurality of carbon particles include graphite particles of two or more kinds having different average particle diameters from each other. This makes it possible to achieve the following five advantages.

Firstly, in a system in which the plurality of carbon particles and the plurality of non-carbon particles are mixed, graphite particles of a large particle diameter having a relatively large average particle diameter and graphite particles of a small particle diameter having a relatively small average particle diameter are mixed in the plurality of carbon particles. In this case, the graphite particles of the small particle diameter are provided in spaces (clearances) surrounded by the graphite particles of the large particle diameter, which allows for an improvement in filling property of the plurality of carbon particles as a whole. Accordingly, in the foregoing mixture system, the non-carbon particles and the carbon particles easily come into contact with each other. Hence, the number of contact points (electrical contact points) between the non-carbon particles and the carbon particles increases. Therefore, even though the non-carbon particles swell or shrink (vary in volume) during electrode reaction, the electrical contact points between the non-carbon particles and the carbon particles are easily secured, thereby suppressing an increase in resistance. Thus, even in a system in which the non-carbon particles easily swell or shrink during electrode reaction, favorable conductive network is formed, thereby securing conductivity.

Secondly, as described above, in association with an improvement in the filling property of the plurality of carbon particles as a whole, volume density (per fixed pressure) of an active material layer containing the plurality of carbon particles is improved, resulting in an improvement in energy density per volume (Wh/dm$^3$=Wh/l). In addition, only small pressure is necessary for compression molding (pressing) of the active material layer, resulting in suppression of breakage (such as fracture) of the carbon particles caused by pressure during compression molding and suppression of breakage (such as deformation) of a current collector caused by the foregoing pressure during compression molding. It is to be noted that in association with such suppression of breakage of the carbon particles, a high-reactive active surface (newly formed surface) is less prone to be formed. Accordingly, side reaction (such as decomposition reaction of an electrolyte) caused by reactivity of the carbon particles is suppressed as well.

Thirdly, since the plurality of carbon particles contain the graphite particles of the small particle diameter, setting the average particle diameter of the graphite particles of the small particle diameter to an appropriately small diameter makes it possible to improve diffusibility in solid of the electrode reactant in the plurality of carbon particles. In this case, in an electrode containing the active material, acceptability of the electrode reactant is improved, and it is therefore less prone to precipitate the electrode reactant during electrode reaction. This makes it possible to stably repeat electrode reaction while suppressing precipitation of the electrode reactant.

Fourthly, since the plurality of carbon particles contain the graphite particles of the large particle diameter, setting a ratio of the graphite particles of the large particle diameter to an appropriately large ratio makes it possible to increase the number of micropores provided between the plurality of carbon particles. This makes it possible to easily impregnate the electrode containing the active material with a liquid electrolyte, thereby easily causing electrode reaction in the entire electrode. Moreover, in association with an improvement in acceptability of the electrode reactant in the electrode, it is less prone to precipitate the electrode reactant. This makes it possible to stably repeat electrode reaction.

Fifthly, since a favorable conductive network is formed in the mixture system of the plurality of carbon particles and the plurality of non-carbon particles as described above, a conductive assistant such as carbon black is not necessarily used to achieve high conductivity. Alternatively, even though the conductive assistant is used, only an extremely small amount of the conductive assistant is necessary. Accordingly, consumption (waste) of the electrolyte and an additive contained in the electrolyte caused by a high specific surface area of carbon black is suppressed. In this case, in particular, in a case in which only the non-carbon particles are used, the electrolyte and the additive tend to be pronouncedly consumed; therefore, even though electrode reaction is repeated with use of the non-carbon particles, the electrolyte and the additive is less prone to be wasted.

[Specific Configuration 1 of Plurality of Carbon Particles]

A specific configuration of the plurality of carbon particles is not particularly limited, as long as the plurality of carbon particles contain a plurality of graphite particles of two or more kinds having different average particle diameters from each other in order for the first-order differential distribution relating to the plurality of carbon particles to have one or more discontinuities. Examples of the specific configuration may include conditions such as an average particle diameter, a specific surface area, and a mixture ratio.

More specifically, the plurality of carbon particles may contain a plurality of graphite particles of three kinds (i.e., a plurality of first graphite particles, a plurality of second graphite particles, and a plurality of third graphite particles) as the plurality of graphite particles of two or more kinds having different average particle diameters from each other. An average particle diameter P1 (μm) of the plurality of first graphite particles, an average particle diameter P2 (μm) of the plurality of second graphite particles, and an average particle diameter P3 (μm) of the plurality of third graphite particles may satisfy P1>P2>P3.

In other words, the plurality of first graphite particles having the average particle diameter P1 may be graphite particles of a large particle diameter. The plurality of second graphite particles having the average particle diameter P2 may be graphite particles of a medium particle diameter. The plurality of third graphite particles having the average particle diameter P3 may be graphite particles of a small particle diameter.

Configurations of the first graphite particles, the second graphite particle, and the third graphite particles each are not particularly limited, as long as the above-described relationship of the average particle diameters P1 to P3 (P1>P2>P3) is satisfied.

In particular, the average particle diameter P1 may preferably satisfy 20 μm≤P1≤40 μm, and more preferably satisfy 25 μm≤P1≤35 μm. The average particle diameter P2 may preferably satisfy 10 μm≤P2≤25 μm, and more preferably satisfy 10 μm≤P2≤20 μm. The average particle diameter P3 may preferably satisfy 1 μm≤P3≤8 μm, and more preferably satisfy 2 μm≤P3≤5 μm. This makes it possible to make the foregoing relationship of the average particle diameters P1 to P3 appropriate, thereby easily achieving the foregoing five advantages.

Moreover, a specific surface area Q1 of the plurality of first graphite particles may satisfy 0.3 m$^2$/g≤Q1≤2 m$^2$/g, and more preferably satisfy 0.5 m$^2$/g≤Q1≤1.5 m$^2$/g. A specific surface area Q2 of the plurality of second graphite particles may preferably satisfy 0.3 m$^2$/g≤Q2≤4 m$^2$/g, and more preferably satisfy 0.5 m$^2$/g≤Q2≤2 m$^2$/g. A specific surface area Q3 of the plurality of third graphite particles may preferably satisfy 2 m$^2$/g≤Q3≤25 m$^2$/g, and more preferably satisfy 10 m$^2$/g≤Q3≤25 m$^2$/g. Even though the plurality of carbon particles and the plurality of non-carbon particles that have high reactivity and easily swell and shrink during charge and discharge are used in combination, a conductive path is secured in the active material, and side reaction of the active material and the electrolyte is less prone to occur.

Moreover, in a mixture ratio of the plurality of carbon particles (the first graphite particles, the second graphite particles, and the third graphite particles), a ratio (carbon ratio) R1 (wt %) of the plurality of first graphite particles, a ratio (carbon ratio) R2 (wt %) of the plurality of second graphite particles, and a ratio (carbon ratio) R3 (wt %) of the plurality of third graphite particles may preferably satisfy R1≥R2>R3. This makes it possible to further improve filling property of the first graphite particles, the second graphite particles, and the third graphite particles.

The carbon ratio R1 is determined by R1 (wt %)=[a weight of the first graphite particles/(the weight of the first graphite particles+a weight of the second graphite particles+a weight of the third graphite particle)]×100. The carbon ratio R2 is determined by R2 (wt %)=[the weight of the second graphite particles/(the weight of the first graphite particles+the weight of the second graphite particles+the weight of the third graphite particles)]×100. The carbon ratio R3 is determined by R3 (wt %)=[the weight of the third graphite particles/the weight of the first graphite particles+ the weight of the second graphite particles+the weight of the third graphite particles)]×100.

In this case, in particular, the carbon ratio R1 may preferably satisfy 40 wt %≤R1≤99 wt %, and more preferably satisfy 45 wt %≤R1≤90 wt %. The carbon ratio R2 may satisfy 5 wt %≤R2≤60 wt %, and more preferably satisfy 10 wt %≤R2≤55 wt %. The carbon ratio R3 may satisfy 0.1 wt %≤R3≤20 wt %, and more preferably satisfy 1 wt %≤R3≤8 wt %. This makes it possible to achieve a higher effect.

The kind of graphite contained in the plurality of carbon particles is not particularly limited, but the second graphite particles of the medium particle diameter may preferably contain natural graphite. Typical natural graphite has a tendency that hardness decreases with an increase in specific surface area; therefore, electrical contact points are easily formed between the carbon particles. Moreover, natural graphite is inexpensive and easily available.

[Specific Configuration 2 of the Plurality of Carbon Particles]

Alternatively, the plurality of carbon particles may contain, for example, two kinds of graphite particles (a plurality of first graphite particles and a plurality of second graphite particles) as the graphite particles of two or more kinds having different average particle diameters from each other. An average particle diameter S1 (μm) of the plurality of first graphite particles and an average particle diameter S2 (μm) of the plurality of second graphite particles may satisfy S1>S2.

In other words, the plurality of first graphite particles having the average particle diameter S are graphite particles of a large particle diameter. The plurality of second graphite particles having the average particle diameter S2 are graphite particles of a small particle diameter.

The configurations of the first graphite particles and the second graphite particles are not particularly limited as long as the foregoing relationship of the average particle diameters S1 and S2 (S1>S2) is satisfied.

In particular, the average particle diameter S1 may preferably satisfy 20 μm≤S1≤40 μm, and more preferably satisfy 25 μm≤S1≤35 μm. The average particle diameter S2 may preferably satisfy 10 μm≤S2≤25 μm, and more preferably satisfy 10 μm≤S2≤20 μm.

Alternatively, the average particle diameter S1 may preferably satisfy 20 μm≤S1≤40 μm, and more preferably satisfy 25 μm≤S1≤35 μm. The average particle diameter S2 may preferably satisfy 1 μm≤S2≤8 μm, and more preferably satisfy 2 μm≤S2≤5 μm.

Alternatively, the average particle diameter S1 may preferably satisfy 10 μm≤S1≤25 μm, and more preferably satisfy 10 μm≤S1≤20 μm. The average particle diameter S2 may preferably satisfy 1 μm≤S2≤8 μm, and more preferably satisfy 2 μm≤S2≤5 μm.

In either case, the foregoing relationship of the average particle diameters S1 and S2 is made appropriate, thereby easily achieving the foregoing five advantages.

Moreover, a specific surface area T1 of the plurality of first graphite particles may preferably satisfy 0.3 m²/g≤T1≤2 m²/g, and more preferably satisfy 0.5 m²/g≤T1≤1.5 m²/g. A specific surface area T2 of the plurality of second graphite particles may satisfy 0.3 m²/g≤T2≤4 m²/g, and more preferably satisfy 0.5 m²/g≤T2≤2 m²/g.

Alternatively, the specific surface area T1 may preferably satisfy 0.3 m²/g≤T1≤2 m²/g, and more preferably satisfy 0.5 m²/g≤T1≤1.5 m²/g. The specific surface area T2 may preferably satisfy 2 m²/g≤T2≤25 m²/g, and more preferably satisfy 5 m²/g≤T2≤25 m²/g.

Alternatively, the specific surface area T1 may preferably satisfy 0.3 m²/g≤T1≤4 m²/g, and more preferably satisfy 0.5 m²/g≤T1≤2 m²/g. The specific surface area T2 may preferably satisfy 2 m²/g≤T2≤25 m²/g, and more preferably satisfy 5 m²/g≤T2≤25 m²/g.

In any of the cases, advantages similar to advantages described relating to the foregoing specific surface areas Q1 to Q3 are achieved.

Furthermore, in a mixture ratio of the plurality of carbon particles (the first graphite particles and the second graphite particles), a ratio (carbon ratio) U1 (wt %) of the plurality of first graphite particles and a ratio (carbon ratio) U2 (wt %) of the plurality of second graphite particles may preferably satisfy U1>U2. This makes it possible to further improve filling property of the first graphite particles and the second graphite particles, thereby further improving filling property of the plurality of carbon particles and the plurality of non-carbon particles as a whole.

In this case, in particular, the carbon ratio U1 may preferably satisfy 0 wt %<U1≤99 wt %. The carbon ratio U2 may preferably satisfy 0 wt %≤U2≤99 wt %.

Alternatively, the carbon ratio U1 may preferably satisfy 0 wt %<U1≤99 wt %. The carbon ratio U2 may preferably satisfy 0 wt %<U2≤20 wt %, and more preferably satisfy 1 wt %≤U2≤8 wt %.

In either case, a higher effect is achievable.

[Specific Configuration of Plurality of Non-Carbon Particles]

A specific configuration of the plurality of non-carbon particles is not particularly limited. The specific configuration is similar to the foregoing specific configuration of the plurality of carbon particles.

More specifically, an average particle diameter V of the plurality of non-carbon particles may preferably satisfy 1 μm≤V≤10 μm, and more preferably satisfy 2 μm≤V≤5 μm. The average particle diameter V of the plurality of non-carbon particles with respect to the average particle diameters P1 to P3, S1, and S1 of the plurality of carbon particles mentioned above is made appropriate, thereby easily achieving the foregoing five advantages.

Moreover, a specific surface area W of the plurality of non-carbon particles may preferably satisfy 2 m²/g≤W≤100 m²/g, and more preferably satisfy 4 m²/g≤W≤40 m²/g. This makes it possible to achieve advantages similar to advantages described relating to the foregoing specific surface areas Q1 to Q3.

In a mixture ratio of the plurality of carbon particles and the plurality of non-carbon particles, a ratio (non-carbon ratio) Z (wt %) of the plurality of non-carbon particles may preferably satisfy 3 wt %≤Z≤30 wt %. This makes it possible to achieve high energy density by the non-carbon particles while suppressing excessive swelling of the active material, thereby improving energy density per volume.

The non-carbon ratio Z is determined by Z (wt %)=[a weight of the non-carbon particles/a weight of the carbon particles+the weight of the non-carbon particles)]×100.

[Method of Specifying Configuration of Active Material]

For example, the respective average particle diameters (μm) of the plurality of carbon particles and the plurality of non-carbon particles may be specified as follows. A secondary battery may be disassembled to take out the active material, and thereafter, the active material may be cleaned. Subsequently, the respective average particle diameters of the plurality of carbon particles and the plurality of non-carbon particles may be measured with use of a particle diameter distribution measurement apparatus. Moreover, in order to obtain the distribution of the integrated value Q of the relative particle amount with respect to the particle diameter D, the plurality of carbon particles may be obtained by a similar procedure, and thereafter, a particle size distribution of the plurality of carbon particles may be measured with use of the particle diameter distribution measurement apparatus. In this case, for example, a particle diameter distribution measurement apparatus SALD-7100 manufactured by Shimadzu Corporation may be used. In addition, for example, it may be possible to measure the average particle diameters and the particle size distribution with use of image analysis software on the basis of a photograph of a cross-section of an anode active material layer to be described later. In this case, for example, particle size distribution image analysis software MAC-VIEW manufactured by Mountech Co., Ltd may be used.

In order to specify the respective specific surface areas (m²/g) of the plurality of carbon particles and the plurality of non-carbon particles, the specific surface areas may be measured by a BET method, for example. In this case, for example, 1 g of each of the respective particles may be used as a measurement sample, and a specific surface area measurement apparatus MACsorb HM-1208 manufactured by Mountech Co., Ltd may be used.

In order to specify the carbon ratio (wt %) of the plurality of carbon particles and the non-carbon ratio (wt %) of the plurality of non-carbon particles, the active material may be subjected to element analysis with use of, for example, a high-frequency inductively coupled plasma (ICP) method, and, for example, true density of the active material may be measured to specify the mixture ratio of the plurality of carbon particles and the plurality of non-carbon particles. In addition, it may be possible to specify the mixture ratio of the carbon particles and the non-carbon particles by separating a discharge curve of the carbon particles and a discharge curve of the non-carbon particles with use of a discharge curve of a secondary battery using the active material.

[Action and Effects of Active Material]

The active material includes the plurality of carbon particles containing graphite and the plurality of non-carbon particles containing the metal-based material, and the first-order differential distribution relating to the plurality of carbon particles has one or more discontinuities. Accordingly, the foregoing five advantages are achieved, which makes it possible to achieve superior battery characteristics in the secondary battery using the active material.

In particular, the plurality of carbon particles contains three kinds of carbon particles (the first graphite particles, the second graphite particles, and the third graphite particles), and when the average particle diameters P1 to P3, the specific surface areas Q1 to Q3, and the carbon ratios R1 to R3 satisfy the foregoing conditions, a high effect is achievable. In this case, when the second graphite particles contain natural graphite, a higher effect is achievable.

Moreover, when the plurality of carbon particles contain two kinds of carbon particles (the first graphite particles and the second graphite particles), and the average particle diameters S1 and S2, the specific surface areas T1 and T2, and the carbon ratios U1 and U2 satisfy the foregoing conditions, a high effect is achievable.

Further, when the average particle diameter V, the specific surface area W, and the non-carbon ratio Z of the plurality of non-carbon particles satisfy the foregoing conditions, a high effect is achievable.

<2. Secondary Battery-Use Electrode and Secondary Battery Using Secondary Battery-Use Active Material>

Next, description is given of a secondary battery-use electrode and a secondary battery each of which uses the active material of the present technology.

<2-1. Lithium-Ion Secondary Battery>

The secondary battery described here may be, for example, a lithium-ion secondary battery in which a capacity of a cathode 21 is obtained by insertion and extraction of lithium (lithium ions) as an electrode reactant.

<2-1-1. Cylindrical Type>

FIGS. 1 and 2 each illustrate a cross-sectional configuration of a secondary battery according to an embodiment of the present technology. FIG. 2 illustrates an enlarged view of part of a spirally wound electrode body 20 illustrated in FIG. 1. The secondary battery described here is a so-called cylindrical type secondary battery.

[Whole Configuration of Secondary Battery]

The secondary battery may contain, for example, the spirally wound electrode body 20 and a pair of insulating plates 12 and 13 inside a battery can 11 having a substantially hollow cylindrical shape. The spirally wound electrode body 20 may be, for example, a spirally wound body of a cathode 21 and an anode 22 that are stacked with a separator 23 in between. The spirally wound electrode body 20 may be impregnated with, for example, an electrolytic solution that is a liquid electrolyte.

The battery can 11 may have, for example, a hollow structure in which one end of the battery can 11 is closed and the other end of the battery can 11 is open. The battery can 11 may be made of one or more of, for example, iron (Fe), aluminum (Al), and an alloy thereof. A surface of the battery can 11 may be plated with, for example, nickel (Ni). The pair of insulating plates 12 and 13 may be so disposed as to sandwich the spirally wound electrode body 20 in between and extend perpendicularly to a spirally wound periphery surface of the spirally wound electrode body 20.

At the open end of the battery can 11, a battery cover 14, a safety valve mechanism 15, and a positive temperature coefficient device (PTC device) 16 may be swaged with a gasket 17, by which the battery can 11 is hermetically sealed. The battery cover 14 may be made of, for example, a material similar to the material of the battery can 11. Each of the safety valve mechanism 15 and the PTC device 16 may be provided on the inner side of the battery cover 14, and the safety valve mechanism 15 may be electrically coupled to the battery cover 14 via the PTC device 16. In the safety valve mechanism 15, when an internal pressure of the battery can 11 reaches a certain level or higher as a result of, for example, internal short circuit or heating from outside, a disk plate 15A inverts. This cuts electric connection between the battery cover 14 and the spirally wound electrode body 20. In order to prevent abnormal heat generation resulting from a large current, resistance of the PTC device 16 increases as a temperature rises. The gasket 17 may be made of, for example, an insulating material. A surface of the gasket 17 may be coated with, for example, asphalt.

For example, a center pin 24 may be inserted in the center of the spirally wound electrode body 20. However, the center pin 24 may not be inserted in the center of the spirally wound electrode body 20. A cathode lead 25 may be coupled to the cathode 21, and an anode lead 26 may be coupled to the anode 22. The cathode lead 25 may be made of, for example, a conductive material such as aluminum. The anode lead 26 may be made of, for example, a conductive material such as nickel. For example, the cathode lead 25 may be attached to the safety valve mechanism 15 by, for example, a welding method, and may be electrically coupled to the battery cover 14. For example, the anode lead 26 may be attached to the battery can 11 by, for example, a welding method, and may be electrically coupled to the battery can 11.

[Cathode]

The cathode 21 may include, for example, a cathode current collector 21A and a cathode active material layer 21B provided on a single surface or both surfaces of the cathode current collector 21A.

The cathode current collector 21A may be made of, for example, one or more of conductive materials such as aluminum, nickel, and stainless steel.

The cathode active material layer 21B may contain, as a cathode active material, one or more of cathode materials that have ability to insert and extract lithium.

The cathode active material layer 21B may further contain one or more of other materials such as a cathode binder and a cathode conductor.

The cathode material may be preferably a lithium-containing compound. More specifically, the cathode material may be preferably one or both of a lithium-containing composite oxide and a lithium-containing phosphate compound, which make it possible to achieve high energy density.

The lithium-containing composite oxide is an oxide that contains lithium and one or more elements that exclude lithium (hereinafter, referred to as "other elements") as constituent elements, and may have, for example, one of a layered rock-salt crystal structure and a spinel crystal structure. The lithium-containing phosphate compound is a phosphate compound that contains lithium and one or more of the other elements as constituent elements, and may have, for example, an olivine crystal structure.

The kinds of the other elements are not particularly limited, as long as the other elements are one or more of any elements. In particular, the other elements may be preferably one or more of elements that belongs to Groups 2 to 15 in the long form of the periodic table of the elements. More specifically, the other elements may more preferably include one or more of nickel (Ni), cobalt (Co), manganese (Mn), and iron (Fe), which make it possible to obtain a high voltage.

The lithium-containing composite oxide having the layered rock-salt crystal structure may be one or more of compounds represented by the following formulas (1) to (3).

$$Li_aMn_{(1-b-c)}Ni_bM1_cO_{(2-d)}F_e \qquad (1)$$

where M1 is one or more of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W), "a" to "e" satisfy $0.8 \leq a \leq 1.2$, $0 < b < 0.5$, $0 \leq c \leq 0.5$, $(b+c) < 1$, $-0.1 \leq d \leq 0.2$, and $0 \leq e \leq 0.1$, it is to be noted that the composition of lithium varies depending on charge and discharge states, and "a" is a value in a completely-discharged state.

$$Li_aNi_{(1-b)}M2_bO_{(2-c)}F_d \qquad (2)$$

where M2 is one or more of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.8 \leq a \leq 1.2$, $0.005 \leq b \leq 0.5$, $-0.1 \leq c \leq 0.2$, and $0 \leq d \leq 0.1$, it is to be noted that the composition of lithium varies depending on charge and discharge states, and "a" is a value in a completely-discharged state.

$$Li_aCO_{(1-b)}M3_bO_{(2-c)}F_d \qquad (3)$$

where M3 is one or more of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.8 \leq a \leq 1.2$, $0 \leq b < 0.5$, $-0.1 \leq c \leq 0.2$, and $0 \leq d \leq 0.1$, it is to be noted that the composition of lithium varies depending on charge and discharge states, and "a" is a value in a completely-discharged state.

Specific examples of the lithium-containing composite oxide having the layered rock-salt crystal structure may include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$.

The lithium-containing composite oxide having the spinel crystal structure may be, for example, one or more of compounds represented by the following formula (4).

$$Li_aMn_{(2-b)}M4_bO_cF_d \qquad (4)$$

where M4 is one or more of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.9 \leq a \leq 1.1$, $0 \leq b \leq 0.6$, $3.7 \leq c \leq 4.1$, and $0 \leq d \leq 0.1$, it is to be noted that the composition of lithium varies depending on charge and discharge states, and "a" is a value in a completely-discharged state.

Specific examples of the lithium-containing composite oxide having the spinel crystal structure may include $LiMn_2O_4$.

The lithium-containing phosphate compound having the olivine crystal structure may be, for example, one or more of compounds represented by the following formula (5).

$$Li_aM5PO_4 \qquad (5)$$

where M5 is one or more of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr), "a" satisfies $0.9 \leq a \leq 1.1$, it is to be noted that the composition of lithium varies depending on charge and discharge states, and "a" is a value in a completely-discharged state.

Specific examples of the lithium-containing phosphate compound having the olivine crystal structure may include $LiFePO_4$, $LiMnPO_4$, $LiFe_{0.5}Mn_{0.5}PO_4$, and $LiFe_{0.3}Mn_{0.7}PO_4$.

It is to be noted that the lithium-containing composite oxide may be, for example, one or more of compounds represented by the following formula (6).

$$(Li_2MnO_3)_x(LiMnO_2)_{1-x} \qquad (6)$$

where "x" satisfies $0 \leq x \leq 1$, it is to be noted that the composition of lithium varies depending on charge and discharge states, and "x" is a value in a completely-discharged state.

In addition, the cathode material may be, for example, one or more of an oxide, a disulfide, a chalcogenide, and a conductive polymer. Examples of the oxide may include titanium oxide, vanadium oxide, and manganese dioxide. Examples of the disulfide may include titanium disulfide and molybdenum sulfide. Examples of the chalcogenide may include niobium selenide. Examples of the conductive polymer may include sulfur, polyaniline, and polythiophene. However, the cathode material may be any material other than the materials mentioned above.

The cathode binder may contain, for example, one or more of synthetic rubbers and polymer materials. Examples of the synthetic rubbers may include a styrene-butadiene-based rubber, a fluorine-based rubber, and ethylene propylene diene. Examples of the polymer materials may include polyvinylidene fluoride, polyimide, carboxymethyl cellulose, and acrylic polymer.

The cathode conductor may contain, for example, one or more of carbon materials. However, the plurality of carbon particles mentioned above are excluded from the carbon materials described here. Examples of the carbon materials may include carbon black, acetylene black, Ketjen black, vapor grown carbon fibers (VGCF), and carbon nanotubes. Alternatively, the cathode conductor may be any other material such as a metal material and a conductive polymer, as long as the cathode conductor is a material having conductivity.

[Anode]

The anode 22 that is the secondary battery-use electrode of the present technology may include, for example, an anode current collector 22A and an anode active material layer 22B provided on a single surface or both surfaces of the anode current collector 22A.

The anode current collector 22A may be made of, for example, one or more of conductive materials such as copper, nickel, and stainless steel. A surface of the anode current collector 22A may be preferably roughened. This makes it possible to improve adhesibility of the anode active material layer 22B with respect to the anode current collector 22A by a so-called anchor effect. In this case, it may be only necessary to roughen the surface of the anode current collector 22A at least in a region facing the anode active material layer 22B. Examples of a roughening method may include a method of forming fine particles with use of electrolytic treatment. Through the electrolytic treatment, fine particles are formed on the surface of the anode current collector 22A in an electrolytic bath by an electrolytic method to make the surface of the anode current collector 22A rough. A copper foil fabricated by the electrolytic method is generally called "electrolytic copper foil".

The anode active material layer 22B contains, as an anode active material, one or more of anode materials that have ability to insert and extract lithium, and the anode materials include one or more of the foregoing active materials of the present technology.

The anode active material layer 22B may further contain one or more of other materials such as an anode binder and an anode conductor. Details of the anode binder and the anode conductor may be respectively similar to, for example, those of the cathode binder and the cathode conductor that have been already described.

In order to prevent lithium from being unintentionally precipitated on the anode 22 in the middle of charge, chargeable capacity of the anode material may be preferably larger than discharge capacity of the cathode 21. In other words, electrochemical equivalent of the anode material that has ability to insert and extract lithium may be preferably larger than electrochemical equivalent of the cathode 21.

The anode active material layer 2B specifically contains the active material of the present technology, which makes it possible to improve filling property of the anode active material (the plurality of carbon particles and the plurality of non-carbon particles), as described above. This makes it possible to sufficiently increase volume density of the anode active material layer 22B, specifically to increase the volume density to 1.7 g/cm$^3$ or more.

The anode active material layer 22B may be formed by, for example, one or more of a coating method, a vapor-phase method, a liquid-phase method, a spraying method, and a firing method (sintering method). The coating method may be, for example, a method in which, after a particulate (powder) anode active material is mixed with, for example, an anode binder, the mixture is dispersed in a solvent such as an organic solvent, and the resultant is applied onto the anode current collector 22A. Examples of the vapor-phase method may include a physical deposition method and a chemical deposition method. More specifically, examples thereof may include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase method may include an electrolytic plating method and an electroless plating method. The spraying method is a method in which an anode active material in a fused state or a semi-fused state is sprayed to the anode current collector 22A. The firing method may be, for example, a method in which, after the mixture dispersed in the solvent is applied onto the anode current collector 22A by the coating method, the resultant is subjected to heat treatment at a temperature higher than a melting point of, for example, the anode binder. For example, one or more of firing methods such as an atmosphere firing method, a reactive firing method, and a hot press firing method may be employed as the firing method.

In the secondary battery, as described above, in order to prevent lithium from being unintentionally precipitated on the anode 22 in the middle of charge, the electrochemical equivalent of the anode material that has ability to insert and extract lithium may be preferably larger than the electrochemical equivalent of the cathode. Moreover, in a case in which an open circuit voltage (that is, a battery voltage) in a completely-charged state is 4.25 V or higher, an extraction amount of lithium per unit mass is larger than that in a case in which the open circuit voltage is 4.20 V, even if the same cathode active material is used. Hence, amounts of the cathode active material and the anode active material are adjusted in accordance therewith. As a result, high energy density is achieved.

[Separator]

The separator 23 separates the cathode 21 from the anode 22, and passes lithium ions therethrough while preventing current short circuit that results from contact between the cathode 21 and the anode 22. The separator 23 may be, for example, one or more of porous films such as porous films of a synthetic resin and ceramics. The separator 23 may be a laminated film in which two or more porous films are laminated. Examples of the synthetic resin may include one or more of polytetrafluoroethylene, polypropylene, and polyethylene.

In particular, the separator 23 may include, for example, the foregoing porous film (a base layer) and a polymer compound layer provided on a single surface or both surfaces of the base layer. This makes it possible to improve adhesibility of the separator 23 with respect to each of the cathode 21 and the anode 22, thereby suppressing deformation of the spirally wound electrode body 20. This makes it possible to suppress decomposition reaction of the electrolytic solution and to suppress liquid leakage of the electrolytic solution with which the base layer is impregnated. Accordingly, even if charge and discharge are repeated, resistance is less prone to increase, and battery swollenness is suppressed.

The polymer compound layer may contain, for example, a polymer material such as polyvinylidene fluoride, which has high physical strength and is electrochemically stable. The polymer material may be any material other than polyvinylidene fluoride. In order to form the polymer compound layer, for example, the base layer may be coated with a solution in which the polymer material is dissolved, and thereafter, the base layer may be dried. Alternatively, the base layer may be immersed in the solution, and thereafter the base layer may be dried.

[Electrolytic Solution]

This electrolytic solution may contain a solvent and an electrolytic salt. It is to be noted that the electrolytic solution may further contain one or more of other materials such as an additive.

The solvent may include one or more of nonaqueous solvents such as an organic solvent. An electrolytic solution containing the nonaqueous solvent is a so-called nonaqueous electrolytic solution.

Examples of the solvent may include a cyclic carbonate ester, a chain carbonate ester, a lactone, a chain carboxylate ester, and a nitrile, which make it possible to achieve, for example, high battery capacity, superior cycle characteristics, and superior storage characteristics. Examples of the cyclic carbonate ester may include ethylene carbonate, propylene carbonate, and butylene carbonate. Examples of the chain carbonate ester may include dimethyl carbonate, diethyl carbonate, ethyl methyl carbonate, and methylpropyl carbonate. Examples of the lactone may include γ-butyrolactone and γ-valerolactone. Examples of the chain carboxylate ester may include methyl acetate, ethyl acetate, methyl propionate, ethyl propionate, methyl butyrate, methyl isobutyrate, methyl trimethylacetate, and ethyl trimethylacetate. Examples of the nitrile may include acetonitrile, glutaronitrile, adiponitrile, methoxyacetonitrile, and 3-methoxypropionitrile. These materials make it possible to achieve high battery capacity, superior cycle characteristics, and superior storage characteristics.

Other than the materials mentioned above, examples of the solvent may include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethylsulfoxide. These solvents make it possible to achieve similar advantages.

In particular, one or more of ethylene carbonate, propylene carbonate, dimethyl carbonate, diethyl carbonate, and ethyl methyl carbonate may be preferable. These materials make it possible to achieve, for example, higher battery capacity, further superior cycle characteristics, and further superior storage characteristics. In this case, a combination of a high-viscosity (high dielectric constant) solvent (having, for example, specific dielectric constant $\varepsilon \geq 30$) such as ethylene carbonate and propylene carbonate and a low-viscosity solvent (having, for example, viscosity≤1 mPa·s) such as dimethyl carbonate, ethylmethyl carbonate, and diethyl carbonate may be more preferable. The combination allows for an improvement in the dissociation property of the electrolyte salt and ion mobility.

In particular, the solvents may include an unsaturated cyclic carbonate ester, a halogenated carbonate ester, a sultone (a cyclic sulfonate ester), and an acid anhydride, which make it possible to improve chemical stability of the electrolytic solution. The unsaturated cyclic carbonate ester is a cyclic carbonate ester having one or more unsaturated bonds (carbon-carbon double bonds). Examples of the unsaturated cyclic carbonate ester may include vinylene carbonate, vinyl ethylene carbonate, and methylene ethylene carbonate. The halogenated carbonate ester is a cyclic or chain carbonate ester containing one or more halogens as constituent elements. Examples of the cyclic halogenated carbonate ester may include 4-fluoro-1,3-dioxolane-2-one and 4,5-difluoro-1,3-dioxolane-2-one. Examples of the chain halogenated carbonate ester may include fluoromethyl methyl carbonate, bis(fluoromethyl) carbonate, and difluoromethyl methyl carbonate. Examples of the sultone may include propane sultone and propene sultone. Examples of the acid anhydride may include succinic anhydride, ethanedisulfonic anhydride, and sulfobenzoic anhydride. It is to be noted that the solvent may be a material other than the materials mentioned above.

Examples of the electrolyte salt may include one or more of salts such as lithium salt. However, the electrolyte salt may contain a salt other than the lithium salt. Examples of the salt other than lithium may include a salt of a light metal other than lithium.

Examples of the lithium salt may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). These lithium salts make it possible to achieve, for example, high battery capacity, superior cycle characteristics, and superior storage characteristics.

In particular, one or more of $LiPF_6$, $LiBF_4$, $LiClO_4$, and $LiAsF_6$ may be preferable, and $LiPF_6$ may be more preferable. These lithium salts make it possible to decrease the internal resistance, thereby achieving a higher effect. Alternatively, the electrolyte salt may be any salt other than the salts mentioned above.

A content of the electrolyte salt is not particularly limited. However, in particular, the content of the electrolyte salt may be preferably from 0.3 mol/kg to 3.0 mol/kg both inclusive with respect to the solvent, which makes it possible to achieve high ionic conductivity.

[Operation of Secondary Battery]

The secondary battery may operate as follows, for example.

When the secondary battery is charged, lithium ions are extracted from the cathode 21 and the extracted lithium ions are inserted in the anode 22 through the electrolytic solution. In contrast, when the secondary battery is discharged, lithium ions are extracted from the anode 22 and the extracted lithium ions are inserted in the cathode 21 through the electrolytic solution.

[Method of Manufacturing Secondary Battery]

The secondary battery may be manufactured by the following procedure, for example.

When fabricating the cathode 21, first, the cathode active material and any other material such as the cathode binder and the cathode conductor may be mixed to obtain a cathode mixture. Subsequently, the cathode mixture may be dispersed in, for example, an organic solvent to obtain paste cathode mixture slurry. Next, both surfaces of the cathode current collector 21A may be coated with the cathode mixture slurry, and thereafter, the coated cathode mixture slurry may be dried to form the cathode active material layer 21B. Lastly, the cathode active material layer 21B may be compression-molded with use of, for example, a roll pressing machine. In such a compression-molding process, the cathode active material layer 21B may be heated, or may be compression-molded a plurality of times.

When fabricating the anode 22, the anode active material layer 22B may be formed on both surfaces of the anode current collector 22A by a procedure similar to the foregoing procedure of fabricating the cathode 21. More specifically, the anode active material containing the active material of the present technology, and any other material such as the anode binder and the anode conductor may be mixed to obtain an anode mixture. Subsequently, the anode mixture may be dispersed in, for example, an organic solvent to obtain paste anode mixture slurry. Next, both surfaces of the anode current collector 22A may be coated with the anode mixture slurry, and thereafter, the coated anode mixture slurry may be dried to form the anode active material layer 22B. Lastly, the anode active material layer 22B may be compression-molded with use of, for example, a roll pressing machine.

When assembling the secondary battery, the cathode lead 25 may be attached to the cathode current collector 21A by, for example, a welding method, and the anode lead 26 may be attached to the anode current collector 22A by, for example, a welding method. Subsequently, the cathode 21 and the anode 22 may be stacked with the separator 23 in between, and the resultant stacked body may be spirally wound to form the spirally wound electrode body 20. Thereafter, the center pin 24 may be inserted in the center of the spirally wound electrode body 20. Subsequently, the spirally wound electrode body 20 may be sandwiched between the pair of insulating plates 12 and 13, and may be contained inside the battery can 11. In this case, an end tip of the cathode lead 25 may be attached to the safety valve mechanism 15 by, for example, a welding method, and an end tip of the anode lead 26 may be attached to the battery can 11 by, for example, a welding method. Subsequently, the electrolytic solution may be injected inside the battery can 11, and the spirally wound electrode body 20 may be impregnated with the injected electrolytic solution. Lastly, the battery cover 14, the safety valve mechanism 15, and the PTC device 16 may be swaged with the gasket 17 at the open end of the battery can 11.

[Action and Effects of Secondary Battery]

According to the cylindrical secondary battery, the anode 22 contains the active material of the present technology as the anode active material, which makes it possible to achieve the five advantages described relating to the active material of the present technology. Accordingly, while lithium acceptability in the anode 22 is secured, superior conductivity is achievable and decomposition reaction of the electrode solution is suppressed. Thus, discharge capacity is less prone to decrease even if charge and discharge are repeated. This makes it possible to achieve superior battery characteristics.

In particular, the filling property of the anode active material in the anode active material layer 22B is improved, which makes it possible to increase the volume density of the anode active material layer 22B to 1.7 g/cm$^3$ or more.

Action and effects other than those described above are similar to those of the active material of the present technology.

<2-1-2. Laminated Film Type>

FIG. 3 illustrates a perspective configuration of another secondary battery according to the embodiment of the present technology, and FIG. 4 is an enlarged view of a cross-section taken along a line IV-IV of a spirally wound electrode body 30 illustrated in FIG. 3. In following description, the components of the cylindrical type secondary battery that have been already described are used where appropriate.

[Whole Configuration of Secondary Battery]

The secondary battery described here may be, for example, a so-called laminated film type lithium-ion secondary battery.

In the secondary battery, for example, the spirally wound electrode body 30 may be contained inside a film-like outer package member 40 as illustrated in FIGS. 3 and 4. In the spirally wound electrode body 30, a cathode 33 and an anode 34 may be stacked with a separator 35 and an electrolyte layer 36 in between, and the resultant stacked body may be spirally wound. A cathode lead 31 may be attached to the cathode 33, and an anode lead 32 may be attached to the anode 34. An outermost periphery of the spirally wound electrode body 30 may be protected by a protective tape 37.

Each of the cathode lead 31 and the anode lead 32 may be led out from inside to outside of the outer package member 40. The cathode lead 31 may be made of, for example, one or more of conductive materials such as aluminum. The anode lead 32 may be made of, for example, one or more of conductive materials such as copper, nickel, and stainless steel. These conductive materials may have, for example, but not limited to, one or more of shapes such as a thin-plate shape and a mesh shape.

The outer package member 40 may be, for example, one film that is foldable in a direction of an arrow R illustrated in FIG. 3, and the outer package member 40 may have a depression for containing of the spirally wound electrode body 30 in part thereof. The outer package member 40 may be a laminated film in which a fusion bonding layer, a metal layer, and a surface protective layer are laminated in this order, for example. In a process of manufacturing the secondary battery, the outer package member 40 may be folded so that portions of the fusion-bonding layer face each other with the spirally wound electrode body 30 in between, and thereafter outer edges of the portions of the fusion bonding layer may be fusion-bonded. Alternatively, two laminated films bonded to each other by, for example, an adhesive may form the outer package member 40. Examples of the fusion bonding layer may include a film made of one or more of polyethylene, polypropylene, and other materials. The metal layer may include, for example, one or more of an aluminum foil and other metal foils. The surface protective layer may be, for example, a film made of one or more of nylon, polyethylene terephthalate, and other materials.

In particular, the outer package member 40 may preferably be an aluminum laminated film in which a polyethylene film, an aluminum foil, and a nylon film are laminated in this order. However, the outer package member 40 may be a laminated film having any other laminated structure, a polymer film such as polypropylene, or a metal film.

For example, an adhesive film 41 for prevention of outside air intrusion may be inserted between the outer package member 40 and the cathode lead 31. Moreover, for example, the adhesive film 41 may be inserted between the outer package member 40 and the anode lead 32 in a similar manner. The adhesive film 41 may be made of a material having adhesibility with respect to the cathode lead 31 and the anode lead 32. Examples of the material having adhesibility may include a polyolefin resin. More specific examples thereof may include one or more of polyethylene, polypropylene, modified polyethylene, and modified polypropylene.

The cathode 33 may include, for example, a cathode current collector 33A and a cathode active material layer 33B provided on a single surface or both surfaces of the cathode current collector 33A. The anode 34 may include, for example, an anode current collector 34A and an anode active material layer 34B provided on a single surface or both surfaces of the anode current collector 34A. The configurations of the cathode current collector 33A, the cathode active material layer 33B, the anode current collector 34A, and the anode active material layer 34B are similar to the configurations of the cathode current collector 21A, the cathode active material layer 21B, the anode current collector 22A, and the anode active material layer 22B, respectively. The configuration of the separator 35 is similar to the configuration of the separator 23.

The electrolyte layer 36 may include an electrolytic solution and a polymer compound. The electrolytic solution may be held by the polymer compound. The electrolyte layer 36 may be a so-called gel electrolyte. The gel electrolyte achieves high ionic conductivity (for example, 1 mS/cm or more at room temperature), and prevents liquid leakage of the electrolytic solution. The electrolyte layer 36 may further include any other material such as an additive.

The polymer material may contain, for example, one or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, poly(methyl methacrylate), polyacrylic acid, polymethacrylic acid, styrene-butadiene rubber, nitrile-butadiene rubber, polystyrene, and polycarbonate. In addition thereto, the polymer material may be a copolymer. The copolymer may be, for example, a copolymer of vinylidene fluoride and hexafluoropropylene. In particular, polyvinylidene fluoride may be preferable as a homopolymer, and a copolymer of vinylidene fluoride and hexafluoropylene may be preferable as a copolymer. Such polymer compounds are electrochemically stable.

For example, the composition of the electrolytic solution may be similar to the composition of the electrolytic solution used in the cylindrical type secondary battery. However, in the electrolyte layer 36 that is a gel electrolyte, the solvent contained in the electrolytic solution refers to a wide concept that encompasses not only a liquid material but also a material having ionic conductivity that has ability to dissociate the electrolyte salt. Hence, in a case in which a polymer compound having ionic conductivity is used, the polymer compound is also encompassed by the solvent.

It is to be noted that the electrolytic solution may be used as it is instead of the gel electrolyte layer 36. In this case, the spirally wound electrode body 30 is impregnated with the electrolytic solution.

[Operation of Secondary Battery]

The secondary battery may operate, for example, as follows.

When the secondary battery is charged, lithium ions are extracted from the cathode 33, and the extracted lithium ions are inserted in the anode 34 through the electrolyte layer 36. In contrast, when the secondary battery is discharged, lithium ions are extracted from the anode 34, and the extracted lithium ions are inserted in the cathode 33 through the electrolyte layer 36.

[Method of Manufacturing Secondary Battery]

The secondary battery including the gel electrolyte layer 36 may be manufactured, for example, by one of the following three procedures.

In a first procedure, the cathode 33 and the anode 34 may be fabricated by a fabrication procedure similar to that of the cathode 21 and the anode 22. More specifically, the cathode 33 may be fabricated by forming the cathode active material layer 33B on both surfaces of the cathode current collector 33A, and the anode 34 may be fabricated by forming the anode active material layer 34B on both surfaces of the anode current collector 34A. Subsequently, for example, the electrolytic solution, the polymer compound, and the solvent may be mixed to prepare a precursor solution. Examples of the solvent may include an organic solvent. Subsequently, each of the cathode 33 and the anode 34 may be coated with the precursor solution, and the coated precursor solution may be dried to form the gel electrolyte layer 36. Subsequently, the cathode lead 31 may be attached to the cathode current collector 33A by, for example, a welding method, and the anode lead 32 may be attached to the anode current collector 34A by, for example, a welding method. Subsequently, the cathode 33 and the anode 34 may be stacked with the separator 35 and the electrolyte layer 36 in between, and thereafter, the cathode 33, the anode 34, the separator 35, and the electrolyte layer 36 may be spirally wound to fabricate the spirally wound electrode body 30. Thereafter, the protective tape 37 may be attached onto the outermost periphery of the spirally wound body 30. Subsequently, the outer package member 40 may be folded to interpose the spirally wound electrode body 30, and thereafter, the outer edges of the outer package member 40 may be bonded by, for example, a thermal fusion bonding method to enclose the spirally wound electrode body 30 in the outer package member 40. In this case, the adhesive film 41 may be inserted between the cathode lead 31 and the outer package member 40, and the adhesive film 41 may be inserted between the anode lead 32 and the outer package member 40.

In a second procedure, the cathode lead 31 may be attached to the cathode 33, and an anode lead 32 may be attached to the anode 34. Subsequently, the cathode 33 and the anode 34 may be stacked with the separator 35 in between and may be spirally wound to fabricate a spirally wound body as a precursor of the spirally wound electrode body 30. Thereafter, the protective tape 37 may be adhered to the outermost periphery of the spirally wound body. Subsequently, the outer package member 40 may be folded to interpose the spirally wound electrode body 30, and thereafter, the outer edges other than one side of the outer package member 40 may be bonded by, for example, a thermal fusion bonding method, and the spirally wound body may be contained inside a pouch formed of the outer package member 40. Subsequently, the electrolytic solution, monomers that are raw materials of the polymer compound, a polymerization initiator, and, on as-necessary basis, other materials such as a polymerization inhibitor may be mixed to prepare a composition for electrolyte. Subsequently, the composition for electrolyte may be injected inside the pouch formed of the outer package member 40. Thereafter, the pouch formed of the outer package member 40 may be hermetically sealed by, for example, a thermal fusion bonding method. Subsequently, the monomers may be thermally polymerized to form the polymer compound. Thus, the gel electrolyte layer 36 may be formed.

In a third procedure, the spirally wound body may be contained inside the pouch formed of the outer package member 40 in a manner similar to that of the second procedure described above, except that the separator 35 with both surfaces coated with a polymer compound is used. Examples of the polymer compound with which the separator 35 is coated may include a polymer containing vinylidene fluoride as a component, and examples of the polymer may include one or more of a homopolymer, a copolymer, and a multicomponent copolymer. Specific examples of the monopolymer may include polyvinylidene fluoride. Specific examples of the copolymer may include a binary copolymer containing vinylidene fluoride and hexafluoropropylene as components. Specific examples of the multicomponent copolymer may include a ternary copolymer containing vinylidene fluoride, hexafluoropropylene, and chlorotrifluoroethylene as components. It is to be noted that, one or more of other polymer compounds may be used together with the polymer containing vinylidene fluoride as a component. Subsequently, the electrolytic solution may be injected inside the pouch formed of the outer package member 40. Thereafter, an opening of the pouch formed of the outer package member 40 may be hermetically sealed by, for example, a thermal fusion bonding method. Subsequently, the resultant may be heated while a weight is applied to the outer package member 40 to cause the separator 35 to be closely attached to the cathode 33 and the anode 34. Thus, the polymer compound may be impregnated with the electrolytic solution, and the polymer compound may be gelated. Thus, the electrolyte layer 36 may be formed.

In the third procedure, swollenness of the secondary battery is suppressed more than in the first procedure. Further, in the third procedure, for example, the monomers that are the raw materials of the polymer compound, and the solvent are hardly left in the electrolyte layer 36, as compared with the second procedure. Accordingly, the formation process of the polymer compound is favorably controlled. As a result, each of the cathode 33, the anode 34, and the separator 35 is sufficiently and closely attached to the electrolyte layer 36.

[Action and Effects of Secondary Battery]

According to the laminated film type lithium secondary battery, the anode 34 contains the active material of the present technology as the anode active material. Therefore, superior battery characteristics are achievable for a reason similar to the reason in the cylindrical type secondary battery. Action and effects other than those described above are similar to those of the cylindrical type secondary battery.

<2-2. Lithium Metal Secondary Battery>

A secondary battery described here is a cylindrical type secondary battery (lithium metal secondary battery) in which the capacity of the anode 22 is obtained by precipitation and dissolution of lithium metal. The secondary battery has a configuration similar to that of the foregoing cylindrical type lithium-ion secondary battery, and is manufactured by a similar procedure, except that the anode active material layer 22B is made of the lithium metal.

In the secondary battery, the lithium metal is used as an anode active material, and high energy density is thereby achievable. The anode active material layer 22B may exist at the time of assembling, or the anode active material layer 22B may not necessarily exist at the time of assembling and may be made of the lithium metal precipitated during charge. Further, the anode active material layer 22B may be used as a current collector, and the anode current collector 22A may be omitted.

The secondary battery may operate, for example, as follows. When the secondary battery is charged, lithium ions are extracted from the cathode 21, and the extracted lithium ions are precipitated as the lithium metal on the surface of the anode current collector 22A through the electrolytic solution. In contrast, when the secondary battery is discharged, the lithium metal is eluded as lithium ions from the anode active material layer 22B, and is inserted in the cathode 21 through the electrolytic solution.

According to the cylindrical type lithium metal secondary battery, the anode 22 contains the active material of the present technology as the anode active material. Therefore, superior battery characteristics are achievable for a reason similar to the reason in the cylindrical type lithium-ion secondary battery. Action and effects other than those described above are similar to those of the cylindrical type lithium-ion secondary battery.

It is to be noted that the lithium metal secondary battery described here is not limited to the cylindrical type secondary battery, and may be a laminated film type secondary battery. Even in this case, similar effects are achievable.

<3. Applications of Secondary Battery>

Next, description is given of application examples of any of the secondary batteries mentioned above.

Applications of the secondary battery are not particularly limited as long as the secondary battery is applied to, for example, a machine, a device, an instrument, an apparatus, and a system (a collective entity of, for example, a plurality of devices) that are able to use the secondary battery as a driving power source, an electric power storage source for electric power accumulation, or any other source. The secondary battery used as the power source may be a main power source (a power source used preferentially), or may be an auxiliary power source (a power source used instead of the main power source or used being switched from the main power source). In a case in which the secondary battery is used as the auxiliary power source, the kind of the main power source is not limited to the secondary battery.

Examples of the applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof may include: a mobile lifestyle appliance such as an electric shaver; a storage device such as a backup power source and a memory card; an electric power tool such as an electric drill and an electric saw; a battery pack used as an attachable and detachable power source of, for example, a notebook personal computer; a medical electronic apparatus such as a pacemaker and a hearing aid; an electric vehicle such as an electric automobile (including a hybrid automobile); and an electric power storage system such as a home battery system for accumulation of electric power for, for example, emergency. It goes without saying that the secondary battery may be employed for an application other than the applications mentioned above.

In particular, the secondary battery may be effectively applicable to, for example, the battery pack, the electric vehicle, the electric power storage system, the electric power tool, and the electronic apparatus. In these applications, superior battery characteristics are demanded, and using the secondary battery of the present technology makes it possible to effectively improve performance. It is to be noted that the battery pack is a power source that uses the secondary battery, and may be, for example, a single battery and an assembled battery that are to be described later. The electric vehicle is a vehicle that operates (runs) using the secondary battery as a driving power source, and may be an automobile (such as a hybrid automobile) that includes together a drive source other than the secondary battery, as described above. The electric power storage system is a system that uses the secondary battery as an electric power storage source. For example, in a home electric power storage system, electric power is accumulated in the secondary battery that is the electric power storage source, which makes it possible to use, for example, home electric products with use of the accumulated electric power. The electric power tool is a tool in which a movable section (such as a drill) is allowed to be moved with use of the secondary battery as a driving power source. The electronic apparatus is an apparatus that executes various functions with use of the secondary battery as a driving power source (an electric power supply source).

Hereinafter, specific description is given of some application examples of the secondary battery. It is to be noted that configurations of the respective application examples described below are mere examples, and may be changed as appropriate.

<3-1. Battery Pack (Single Battery)>

FIG. 5 illustrates a perspective configuration of a battery pack using a single battery. FIG. 6 illustrates a block configuration of the battery pack illustrated in FIG. 5. It is to be noted that FIG. 5 illustrates the battery back in an exploded state.

The battery back described here is a simple battery pack using one secondary battery (a so-called soft pack), and may be mounted in, for example, an electronic apparatus typified by a smartphone. For example, the battery pack may include a power source 111 that is the laminated film type secondary battery, and a circuit board 116 coupled to the power source 111, as illustrated in FIG. 5. A cathode lead 112 and an anode lead 113 may be attached to the power source 111.

A pair of adhesive tapes 118 and 119 may be adhered to both side surfaces of the power source 111. A protection circuit module (PCM) may be formed in the circuit board 116. The circuit board 116 may be coupled to the cathode lead 112 through a tab 114, and be coupled to the anode lead 113 through a tab 115. Moreover, the circuit board 116 may be coupled to a lead 117 provided with a connector for external connection. It is to be noted that while the circuit board 116 is coupled to the power source 111, the circuit board 116 may be protected from upper side and lower side by a label 120 and an insulating sheet 121. The label 120 may be adhered to fix, for example, the circuit board 116 and the insulating sheet 121.

Moreover, for example, the battery pack may include the power source 111 and the circuit board 116 as illustrated in FIG. 6. The circuit board 116 may include, for example, a controller 121, a switch section 122, a PTC element 123, and a temperature detector 124. The power source 111 is connectable to outside through a cathode terminal 125 and an anode terminal 127, and is thereby charged and discharged through the cathode terminal 125 and the anode terminal 127. The temperature detector 124 is allowed to detect a temperature with use of a temperature detection terminal (a so-called T terminal) 126.

The controller 121 controls an operation of the entire battery pack (including a used state of the power source 111), and may include, for example, a central processing unit (CPU) and a memory.

For example, in a case in which a battery voltage reaches an overcharge detection voltage, the controller 121 may so cause the switch section 122 to be disconnected that a charge current does not flow into a current path of the power source 111. Moreover, for example, in a case in which a large current flows during charge, the controller 121 may cause the switch section 122 to be disconnected, thereby blocking the charge current.

In addition, for example, in a case in which the battery voltage reaches an overdischarge detection voltage, the controller 121 may so cause the switch section 122 to be disconnected that a discharge current does not flow into the current path of the power source 111. Moreover, for example, in a case in which a large current flows during discharge, the controller 121 may cause the switch section 122 to be disconnected, thereby blocking the discharge current.

It is to be noted that the overcharge detection voltage of the secondary battery may be, for example, 4.20 V±0.05 V, and the overdischarge detection voltage may be, for example, 2.4 V+0.1 V.

The switch section 122 switches the used state of the power source 111 (whether the power source 111 is connectable to an external device) in accordance with an instruction from the controller 121. The switch section 122 may include, for example, a charge control switch and a discharge control switch. The charge control switch and the discharge control switch each may be, for example, a semiconductor switch such as a field-effect transistor using a metal oxide semiconductor (MOSFET). It is to be noted that the charge current and the discharge current may be detected on the basis of on-resistance of the switch section 122.

The temperature detector 124 measures a temperature of the power source 111, and outputs a result of the measurement to the controller 121. The temperature detector 124 may include, for example, a temperature detecting element such as a thermistor. It is to be noted that the result of the measurement by the temperature detector 124 may be used, for example, in a case in which the controller 121 performs charge and discharge control at the time of abnormal heat generation and in a case in which the controller 121 performs a correction process at the time of calculating remaining capacity.

It is to be noted that the circuit board 116 may not include the PTC element 123. In this case, a PTC element may be separately attached to the circuit board 116.

<3-2. Battery Pack (Assembled Battery)>

FIG. 7 illustrates a block configuration of a battery pack using an assembled battery. For example, the battery pack may include a controller 61, a power source 62, a switch section 63, a current measurement section 64, a temperature detector 65, a voltage detector 66, a switch controller 67, a memory 68, a temperature detecting element 69, a current detection resistance 70, a cathode terminal 71, and an anode terminal 72 inside a housing 60. The housing 60 may be made of, for example, a plastic material.

The controller 61 controls an operation of the entire battery pack (including a used state of the power source 62), and may include, for example, a CPU. The power source 62 includes one or more secondary batteries. The power source 62 may be, for example, an assembled battery that includes two or more secondary batteries. The secondary batteries may be connected in series, in parallel, or in series-parallel combination. To give an example, the power source 62 may include six secondary batteries in which two sets of series-connected three batteries are connected in parallel to each other.

The switch section 63 switches the used state of the power source 62 (whether the power source 62 is connectable to an external device) in accordance with an instruction from the controller 61. The switch section 63 may include, for example, a charge control switch, a discharge control switch, a charging diode, and a discharging diode. The charge control switch and the discharge control switch each may be, for example, a semiconductor switch such as a field-effect transistor that uses a metal oxide semiconductor (a MOSFET).

The current measurement section 64 measures a current with use of the current detection resistance 70, and outputs a result of the measurement to the controller 61. The temperature detector 65 measures a temperature with use of the temperature detecting element 69, and outputs a result of the measurement to the controller 61. The result of the temperature measurement may be used, for example, in a case in which the controller 61 performs charge and discharge control at the time of abnormal heat generation and in a case in which the controller 61 performs a correction process at the time of calculating remaining capacity. The voltage detector 66 measures voltages of the secondary batteries in the power source 62, performs analog-to-digital conversion on the measured voltage, and supplies the resultant to the controller 61.

The switch controller 67 controls an operation of the switch section 63 in accordance with signals inputted from the current measurement section 64 and the voltage detector 66.

For example, in a case in which a battery voltage reaches an overcharge detection voltage, the switch controller 67 may so cause the switch section 63 (the charge control switch) to be disconnected that a charge current does not flow into a current path of the power source 62. This makes it possible to perform only discharge through the discharging diode in the power source 62. It is to be noted that, for example, when a large current flows during charge, the switch controller 67 may block the charge current.

Further, for example, in a case in which the battery voltage reaches an overdischarge detection voltage, the switch controller 67 may so cause the switch section 63 (the discharge control switch) to be disconnected that a discharge current does not flow into the current path of the power source 62. This makes it possible to perform only charge through the charging diode in the power source 62. It is to be noted that, for example, when a large current flows during discharge, the switch controller 67 may block the discharge current.

It is to be noted that the overcharge detection voltage of the secondary battery may be, for example, 4.20 V±0.05 V, and the overdischarge detection voltage may be, for example, 2.4 V 0.1 V.

The memory 68 may be, for example, an EEPROM that is a non-volatile memory. The memory 68 may hold, for example, numerical values calculated by the controller 61 and information of the secondary battery measured in a manufacturing process (such as internal resistance in an initial state). It is to be noted that, in a case in which the memory 68 holds full charge capacity of the secondary battery, the controller 61 is allowed to comprehend information such as remaining capacity.

The temperature detecting element 69 measures a temperature of the power source 62, and outputs a result of the measurement to the controller 61. The temperature detecting element 69 may be, for example, a thermistor.

The cathode terminal 71 and the anode terminal 72 are terminals that may be coupled to, for example, an external device (such as a notebook personal computer) driven with use of the battery pack or an external device (such as a battery charger) used for charge of the battery pack. The power source 62 is charged and discharged via the cathode terminal 71 and the anode terminal 72.

<3-3. Electric Vehicle>

FIG. 8 illustrates a block configuration of a hybrid automobile that is an example of an electric vehicle. The electric vehicle may include, for example, a controller 74, an engine 75, a power source 76, a driving motor 77, a differential 78, an electric generator 79, a transmission 80, a clutch 81, inverters 82 and 83, and various sensors 84 inside a housing 73 made of metal. Other than the components mentioned above, the electric vehicle may include, for example, a front drive shaft 85 and a front tire 86 that are coupled to the differential 78 and the transmission 80, and a rear drive shaft 87, and a rear tire 88.

The electric vehicle may be runnable with use of one of the engine 75 and the motor 77 as a drive source, for example. The engine 75 is a main power source, and may be, for example, a petrol engine. In a case in which the engine 75 is used as the power source, drive power (torque) of the engine 75 may be transferred to the front tire 86 or the rear tire 88 via the differential 78, the transmission 80, and the clutch 81 that are drive sections, for example. It is to be noted that the torque of the engine 75 may be also transferred to the electric generator 79. With use of the torque, the electric generator 79 generates alternating-current electric power. The generated alternating-current electric power is converted into direct-current electric power via the inverter 83, and the converted electric power is accumulated in the power source 76. In a case in which the motor 77 that is a conversion section is used as the power source, electric power (direct-current electric power) supplied from the power source 76 is converted into alternating-current electric power via the inverter 82, and the motor 77 is driven with use of the alternating-current electric power. Drive power (torque) obtained by converting the electric power by the motor 77 may be transferred to the front tire 86 or the rear tire 8 via the differential 78, the transmission 80, and the clutch 81 that are the drive sections, for example.

It is to be noted that, when speed of the electric vehicle is decreased by an unillustrated brake mechanism, resistance at the time of speed reduction may be transferred to the motor 77 as torque, and the motor 77 may generate alternating-current electric power by utilizing the torque. It may be preferable that this alternating-current electric power be converted into direct-current electric power via the inverter 82, and the direct-current regenerative electric power be accumulated in the power source 76.

The controller 74 controls an operation of the entire electric vehicle, and may include, for example, a CPU. The power source 76 includes one or more secondary batteries. The power source 76 may be coupled to an external power source, and the power source 76 may be allowed to accumulate electric power by receiving electric power supply from the external power source. The various sensors 84 may be used, for example, for control of the number of revolutions of the engine 75 and for control of an opening level (a throttle opening level) of an unillustrated throttle valve. The various sensors 84 may include, for example, a speed sensor, an acceleration sensor, and an engine frequency sensor.

It is to be noted that, although the description has been given of the case in which the electric vehicle is the hybrid automobile, the electric vehicle may be a vehicle (an electric automobile) that operates with use of only the power source 76 and the motor 77 and without using the engine 75.

<3-4. Electric Power Storage System>

FIG. 9 illustrates a block configuration of an electric power storage system. The electric power storage system may include, for example, a controller 90, a power source 91, a smart meter 92, and a power hub 93 inside a house 89 such as a general residence or a commercial building.

In this example, the power source 91 may be coupled to an electric device 94 provided inside the house 89 and may be allowed to be coupled to an electric vehicle 96 parked outside the house 89, for example. Further, for example, the power source 91 may be coupled to a private power generator 95 provided in the house 89 via the power hub 93, and may be allowed to be coupled to an outside concentrating electric power system 97 via the smart meter 92 and the power hub 93.

It is to be noted that the electric device 94 may include, for example, one or more home electric products. Examples of the home electric products may include a refrigerator, an air conditioner, a television, and a water heater. The private power generator 95 may include, for example, one or more of a solar power generator, a wind power generator, and other power generators. The electric vehicle 96 may include, for example, one or more of an electric automobile, an electric motorcycle, a hybrid automobile, and other electric vehicles. The concentrating electric power system 97 may include, for example, one or more of a thermal power plant, an atomic power plant, a hydraulic power plant, a wind power plant, and other power plants.

The controller 90 controls an operation of the entire electric power storage system (including a used state of the power source 91), and may include, for example, a CPU. The power source 91 includes one or more secondary batteries. The smart meter 92 may be an electric power meter that is compatible with a network and is provided in the house 89 demanding electric power, and may be communicable with an electric power supplier, for example. Accordingly, for example, while the smart meter 92 communicates with outside, the smart meter 92 controls balance between supply and demand in the house 89, which allows for effective and stable energy supply.

In the electric power storage system, for example, electric power may be accumulated in the power source 91 from the concentrating electric power system 97, that is an external power source, via the smart meter 92 and the power hub 93, and electric power may be accumulated in the power source 91 from the private power generator 95, that is an independent power source, via the power hub 93. The electric power accumulated in the power source 91 is supplied to the electric device 94 and the electric vehicle 96 in accordance with an instruction from the controller 90. This allows the electric device 94 to be operable, and allows the electric vehicle 96 to be chargeable. In other words, the electric power storage system is a system that makes it possible to accumulate and supply electric power in the house 89 with use of the power source 91.

The electric power accumulated in the power source 91 is allowed to be utilized optionally. Hence, for example, electric power may be accumulated in the power source 91 from the concentrating electric power system 97 in the middle of night when an electric rate is inexpensive, and the electric power accumulated in the power source 91 may be used during daytime hours when the electric rate is expensive.

It is to be noted that the foregoing electric power storage system may be provided for each household (each family unit), or may be provided for a plurality of households (a plurality of family units).

<3-5. Electric Power Tool>

FIG. 10 illustrates a block configuration of an electric power tool. The electric power tool may be, for example, an electric drill, and may include a controller 99 and a power source 100 inside a tool body 98 made of a plastic material, for example. A drill section 101 that is a movable section may be attached to the tool body 98 in an operable (rotatable) manner, for example.

The controller 99 controls an operation of the entire electric power tool (including a used state of the power source 100), and may include, for example, a CPU. The power source 100 includes one or more secondary batteries. The controller 99 allows electric power to be supplied from the power source 100 to the drill section 101 in accordance with an operation by an operation switch.

EXAMPLES

Examples of the present technology will be described in detail below.

Experimental Examples 1-1 to 1-17

Coin type lithium-ion secondary batteries illustrated in FIG. 11 were fabricated for test-use secondary batteries by the following procedure. In each of the secondary batteries, a counter electrode 51 (cathode) and a test electrode 53 (anode) were stacked with a separator 55 in between, and an outer package can 52 containing the counter electrode 51 and an outer package cup 54 containing the test electrode 53 were swaged with a gasket 56.

The counter electrode 51 was fabricated as follows. First, 98 parts by mass of a cathode active material ($LiCoO_2$), 1 part by mass of a cathode binder (polyvinylidene fluoride: PVDF), and 1 part by mass of a cathode conductor (ketjen black) were mixed to obtain a cathode mixture. Subsequently, the cathode mixture was mixed with an organic solvent (N-methyl-2-pyrrolidone), and thereafter, the resultant mixture was kneaded with use of a planetary centrifugal mixer to obtain paste cathode mixture slurry. Subsequently, a single surface of a cathode current collector (an aluminum foil having a thickness of 15 µm) was coated with the cathode mixture slurry with use of a coating apparatus, and thereafter, the cathode mixture slurry was dried (at 120° C.) to form a cathode active material layer. Lastly, the cathode active material layer was compression-molded with use of a hand pressing machine, and thereafter, the cathode active material layer was dried in a vacuum. In the compression molding process, volume density of the cathode active material layer was 3.75 $g/cm^3$.

The test electrode 53 was fabricated as follows. First, an anode active material (a plurality of carbon particles and a plurality of non-carbon particles), an anode binder, and an anode conductor were mixed at a predetermined ratio (a mixture ratio: wt %) to obtain an anode mixture. Composition and a mixture ratio (wt %) of the anode binder is as illustrated in Table 1. It is to be noted that in a case in which a solvent used for preparation of anode mixture slurry to be described later was an organic solvent (N-methyl-2-pyrrolidone), PVDF was used as the anode binder. Moreover, in a case in which the solvent was water ($H_2O$), a mixture of PVDF and carboxymethyl cellulose (CMC) was used as the anode binder As the plurality of carbon particles, three kinds of graphite particles (first graphite particles, second graphite particles, and third graphite particles) were used. In this case, one or two kinds of the three kinds of graphite particles were used as necessary. It is to be noted that the first graphite particles, the second graphite particles, and the third graphite particles are respectively referred to as "large particles", "medium particles", and "small particles" for simplification. The presence or absence, kinds, mixture ratios (wt %), average particle diameters P1 to P3 (median diameter D50: µm), specific surface areas Q1 to Q3 ($m^2/g$), and carbon ratios R1 to R3 (wt %) of the large particles, the medium particles, and the small particles are as illustrated in Table 1 and Table 2.

As the non-carbon particles, silicon oxide particles (Si oxide) as a compound of silicon and silicon alloy particles (Si alloy) as an alloy of silicon and iron were used. The kind, mixture ratio (wt %), average particle diameter V (median diameter D50: µm), specific surface area W ($m^2/g$), and non-carbon ratio Z (wt %) of the non-carbon particles are as illustrated in Table 1 and Table 2.

As the anode conductor, a mixture of carbon black (CB) and fibrous carbon (VGCF) was used. A mixture ratio (wt %) of the mixture is as illustrated in Table 1.

Subsequently, the anode mixture was mixed with the solvent, and thereafter the resultant mixture was kneaded with use of a planetary centrifugal mixer to obtain paste anode mixture slurry. As the solvent, an organic solvent (N-methyl-2-pyrrolidone) was used in the case in which the anode active material was Si oxide, and water ($H_2O$) was used in the case in which the anode active material was the Si alloy. Subsequently, a single surface of an anode current collector (a copper foil having a thickness of 12 μm) was coated with the anode mixture slurry with use of a coating apparatus, and thereafter, the anode mixture slurry was dried (at 120° C.) to form an anode active material layer. Lastly, the anode active material layer was compression-molded (at 23° C. and 10 MPa) with use of a hand pressing machine, and thereafter, the anode active material layer was dried in a vacuum. The volume density ($g/cm^3$) of the anode active material layer having been dried in a vacuum is as illustrated in Table 2.

The electrolytic solution was prepared as follows. An electrolyte salt ($LiPF_6$) was dissolved in a mixture solvent of ethylene carbonate (EC), dimethyl carbonate (DMC), and 4-fluoro-1,3-dioxolane-2-one (FEC). The mixture ratio (weight ratio) of the mixture solvent was EC:DMC:FEC=25:63:12. A content of the electrolyte salt was 1 mol/kg with respect to the mixture solvent.

The secondary battery was assembled as follows. The counter electrode 51 was stamped into a pellet shape, and thereafter the pellet-shaped counter electrode 51 was contained in the outer package can 52. Subsequently, the test electrode 53 was stamped into a pellet shape, and thereafter the pellet-shaped test electrode 53 was contained in the outer package cup 54. Subsequently, the counter electrode 51 contained in the outer package can 52 and the test electrode 53 contained in the outer package cup 54 were stacked with the separator 55 (a microporous polypropylene film having a thickness of 25 μm) in between, and thereafter, the outer package can 52 and the outer package cup 54 were swaged with a gasket 56. Thus, the coin type secondary battery (having a diameter of 20 mm and a height of 1.6 mm) was completed.

When battery characteristics (cycle characteristics) of the secondary batteries were examined, results illustrated in Table 2 were obtained. The cycle characteristics were examined by the following procedure.

First, one cycle of charge and discharge was performed on each of the secondary batteries in an ambient temperature environment (23° C.) to measure discharge capacity at the first cycle. In this case, the secondary battery was charged at a current of 0.2 C until a battery voltage reached 4.3 V, and thereafter the secondary battery was charged while keeping the battery voltage until current density reached 0.025 C. Moreover, the secondary battery was discharged at a current of 0.2 C until the battery voltage reached 2.5 V. It is to be noted that "0.2 C" refers to a current value at which the battery capacity (theoretical capacity) is completely discharged in 5 hours, and "0.025 C" refers to a current value at which the battery capacity is completely discharged in 40 hours.

Subsequently, the secondary battery was repeatedly charged and discharged until the total number of cycles reached 300 cycles in the same environment to measure discharge capacity at the 300th cycle. In this case, the secondary battery was charged at a current of 0.5 C until the battery voltage reached 4.3 V, and thereafter, the secondary battery was charged while keeping the battery voltage until the current density reached 0.025 C. Moreover, the secondary battery was discharged at a current of 0.5 C until the battery voltage reached 2.5 V. It is to be noted that "0.5 C" refers to a current value at which the battery capacity is completely discharged in 2 hours.

Lastly, a capacity retention ratio (%)=(discharge capacity at the 300th cycle/discharge capacity at the first cycle)×100 was calculated.

TABLE 1

| | Kind | | | | | | Mixture Ratio (wt %) | | | | | |
|---|---|---|---|---|---|---|---|---|---|---|---|---|
| | Anode Active Material | | | | | | Anode Active Material | | | | | |
| Experimental Example | Carbon Particles (Large Particles) | Carbon Particles (Medium Particles) | Carbon Particles (Small Particles) | Non-Carbon Particles | Anode Conductor | Anode Binder | Carbon Particles (Large Particles) | Carbon Particles (Medium Particles) | Carbon Particles (Small Particles) | Non-Carbon Particles | Anode Conductor | Anode Binder |
| 1-1 | MCMB | MCMB | Artificial Graphite | Si Oxide | CB + VGCF | PVDF | 42.5 | 42.5 | 1 | 5 | 1 + 3 | 5 |
| 1-2 | MCMB | MCMB | Artificial Graphite | Si Oxide | CB + VGCF | PVDF | 51 | 34 | 1 | 5 | 1 + 3 | 5 |
| 1-3 | MCMB | MCMB | Artificial Graphite | Si Oxide | CB + VGCF | PVDF | 76.5 | 8.5 | 1 | 5 | 1 + 3 | 5 |
| 1-4 | MCMB | MCMB | Artificial Graphite | Si Oxide | CB + VGCF | PVDF | 42.5 | 42.5 | 1 | 5 | 1 + 3 | 5 |
| 1-5 | MCMB | Natural Graphite | Artificial Graphite | Si Oxide | CB + VGCF | PVDF | 42.5 | 42.5 | 1 | 5 | 1 + 3 | 5 |
| 1-6 | MCMB | Natural Graphite | Artificial Graphite | Si Oxide | CB + VGCF | PVDF | 76.5 | 8.5 | 1 | 5 | 1 + 3 | 5 |
| 1-7 | MCMB | MCMB | Artificial Graphite | Si Oxide | CB + VGCF | PVDF | 59.5 | 25.5 | 1 | 5 | 1 + 3 | 5 |
| 1-8 | MCMB | MCMB | Artificial Graphite | Si Oxide | — | PVDF | 42.5 | 42.5 | 5 | 5 | — | 5 |
| 1-9 | MCMB | MCMB | Artificial Graphite | Si Oxide | — | PVDF | 41.5 | 41.5 | 7 | 5 | — | 5 |
| 1-10 | MCMB | MCMB | Artificial Graphite | Si Oxide | CB + VGCF | PVDF | 40 | 40 | 1 | 10 | 1 + 3 | 5 |
| 1-11 | MCMB | MCMB | Artificial Graphite | Si Alloy | CB + VGCF | PVDF + CMC | 42 | 42 | 2 | 5 | 1 + 3 | 3 + 2 |

TABLE 1-continued

| | Kind | | | | | | Mixture Ratio (wt %) | | | | | |
|---|---|---|---|---|---|---|---|---|---|---|---|---|
| | Anode Active Material | | | | | | Anode Active Material | | | | | |
| Experimental Example | Carbon Particles (Large Particles) | Carbon Particles (Medium Particles) | Carbon Particles (Small Particles) | Non-Carbon Particles | Anode Conductor | Anode Binder | Carbon Particles (Large Particles) | Carbon Particles (Medium Particles) | Carbon Particles (Small Particles) | Non-Carbon Particles | Anode Conductor | Anode Binder |
| 1-12 | MCMB | MCMB | Artificial Graphite | Si Alloy | CB + VGCF | PVDF + CMC | 34.5 | 34.5 | 2 | 20 | 1 + 3 | 3 + 2 |
| 1-13 | MCMB | Natural Graphite | Artificial Graphite | Si Oxide | CB + VGCF | PVDF | 42.5 | 42.5 | 1 | 5 | 1 + 3 | 5 |
| 1-14 | MCMB | Natural Graphite | Artificial Graphite | Si Oxide | CB + VGCF | PVDF | 76.5 | 8.5 | 1 | 5 | 1 + 3 | 5 |
| 1-15 | — | MCMB | — | Si Oxide | CB + VGCF | PVDF | — | 85 | — | 5 | 2 + 3 | 5 |
| 1-16 | MCMB | — | — | Si Oxide | CB + VGCF | PVDF | 85 | — | — | 5 | 2 + 3 | 5 |
| 1-17 | — | MCMB | — | Si Alloy | CB + VGCF | PVDF + CMC | — | 70 | — | 20 | 2 + 3 | 3 + 2 |

TABLE 2

| Experimental Example | Average Particle Diameter (D50: μm) | | | | Specific Surface Area ($m^2/g$) | | | | Carbon Ratio (wt %) | | | Non-carbon Ratio Z (wt %) | Volume Density ($g/cm^2$) | Capacity Retention Ratio (%) |
|---|---|---|---|---|---|---|---|---|---|---|---|---|---|---|
| | P1 | P2 | P3 | V | Q1 | Q2 | Q3 | W | R1 | R2 | R3 | | | |
| 1-1 | 32 | 15 | 3.4 | 4.4 | 0.66 | 0.73 | 20 | 4.5 | 49.42 | 49.42 | 1.16 | 5.49 | 1.79 | 84 |
| 1-2 | 32 | 15 | 3.4 | 4.4 | 0.66 | 0.73 | 20 | 4.5 | 59.3 | 39.53 | 1.17 | 5.49 | 1.75 | 83 |
| 1-3 | 32 | 15 | 3.4 | 4.4 | 0.66 | 0.73 | 20 | 4.5 | 88.95 | 9.88 | 1.17 | 5.49 | 1.72 | 83 |
| 1-4 | 33 | 13 | 3.4 | 4.4 | 0.81 | 1.25 | 20 | 4.5 | 49.42 | 49.42 | 1.16 | 5.49 | 1.67 | 85 |
| 1-5 | 33 | 15 | 3.4 | 4.4 | 0.81 | 1.22 | 20 | 4.5 | 49.42 | 49.42 | 1.16 | 5.49 | 1.71 | 83 |
| 1-6 | 33 | 15 | 3.4 | 4.4 | 0.81 | 1.22 | 20 | 4.5 | 88.95 | 9.88 | 1.17 | 5.49 | 1.71 | 86 |
| 1-7 | 32 | 15 | 8 | 4.4 | 0.71 | 3.1 | 12 | 4.5 | 69.19 | 29.65 | 1.16 | 5.49 | 1.77 | 83 |
| 1-8 | 32 | 15 | 3.4 | 4.4 | 0.66 | 0.73 | 20 | 4.5 | 47.22 | 47.22 | 5.56 | 5.26 | 1.75 | 88 |
| 1-9 | 32 | 15 | 3.4 | 4.4 | 0.66 | 0.73 | 20 | 4.5 | 46.11 | 46.11 | 7.78 | 5.26 | 1.73 | 85 |
| 1-10 | 32 | 15 | 3.4 | 4.4 | 0.66 | 0.73 | 20 | 4.5 | 49.38 | 49.38 | 1.24 | 10.99 | 1.79 | 79 |
| 1-11 | 32 | 15 | 3.4 | 3.2 | 0.66 | 0.73 | 20 | 35 | 48.84 | 48.84 | 2.32 | 5.49 | 1.8 | 82 |
| 1-12 | 32 | 15 | 3.4 | 3.2 | 0.66 | 0.73 | 20 | 35 | 48.59 | 48.59 | 2.82 | 21.98 | 1.83 | 73 |
| 1-13 | 33 | 22 | 3.4 | 4.4 | 0.81 | 0.89 | 20 | 4.5 | 49.42 | 49.42 | 1.16 | 5.49 | 1.71 | 68 |
| 1-14 | 33 | 22 | 3.4 | 4.4 | 0.81 | 0.89 | 20 | 4.5 | 88.95 | 9.88 | 1.17 | 5.49 | 1.72 | 66 |
| 1-15 | — | 10 | — | 4.4 | — | 3.1 | — | 4.5 | — | 100 | — | 5.56 | 1.62 | 59 |
| 1-16 | 32 | — | — | 4.4 | 0.66 | — | — | 4.5 | 100 | — | — | 5.56 | 1.62 | 58 |
| 1-17 | — | 10 | — | 3.2 | — | 3.1 | — | 35 | — | 100 | — | 28.57 | 1.68 | 50 |

The capacity retention ratio in a case in which the plurality of carbon particles and the plurality of non-carbon particles were used in combination largely varied depending on the configuration of the plurality of carbon particles.

More specifically, in a case in which the carbon particles contained three kinds of graphite particles (experimental examples 1-1 to 1-14), as compared with a case in which the carbon particles contained only one kind of graphite particles (experimental examples 1-15 to 1-17), the capacity retention ratio was largely increased independent of the kind of graphite and the kind of the non-carbon particles. Moreover, in the case in which the carbon particles contained three kinds of graphite particles, volume density equal to or higher than volume density in the case in which the carbon particles contained only one kind of graphite particles was obtained.

Experimental Examples 2-1 to 2-4

As illustrated in Table 3 and Table 4, secondary batteries were fabricated by a similar procedure, except that two kinds of graphite particles (the first graphite particles and the second graphite particles) were used as the plurality of carbon particles, and battery characteristics of the secondary batteries were examined.

Herein, any two of the large particles, the medium particles, and the small particles mentioned above were used as the two kinds of graphite particles. The first graphite particles described here are particles having a relative large particle diameter of two kinds of particles, and the second graphite particles described here are particles having a relatively small particle diameter of the two kinds of particles.

More specifically, in experimental examples 2-1 and 2-2 in which the medium particles and the small particles were used, the medium particles having a relatively large particle diameter correspond to the first graphite particles, and the small particles having a relatively small particle diameter correspond to the second graphite particles. In an experimental example 2-3 in which the large particles and the small particles were used, the large particles having a relatively large particle diameter correspond to the first graphite particles, and the small particles having a relatively small particle diameter correspond to the second graphite particles. In an experimental example 2-4 in which the large particles and the medium particles were used, the large particles having a relatively large particle diameter correspond to the first graphite particles, and the medium particles having a relatively small particle diameter correspond to the second graphite particles.

Accordingly, the average particle diameter of particles having a relatively large particle diameter of the average particle diameters P1 to P3 corresponds to the average particle diameter S1, and the average particle diameter of particle having a relatively small particle diameter of the average particle diameters P1 to P3 corresponds to the average particle diameter S2. Moreover, the specific surface area of the particles having a relatively large particle diameter of the specific surface areas Q1 to Q3 illustrated in Table 4 corresponds to the specific surface area T1, and the specific surface area of the particles having a relatively small particle diameter of the specific surface area Q1 to Q3 corresponds to the specific surface area T2. Further, the carbon ratio of the particle having a relatively large particle diameter of the carbon ratios R1 to R3 illustrated in Table 4 corresponds to a carbon ratio U1, and the carbon ratio of the particle having a relatively small particle diameter of the carbon ratios R1 to R3 corresponds to a carbon ratio U2.

were used (Table 1 and Table 2) were obtained. In other words, in the case in which the carbon particles contained two kinds of graphite particles (the experimental examples 2-1 to 2-4), as compared with the carbon particles contained only one kind of graphite particles (the experimental examples 1-15 to 1-17), the capacity retention ratio was largely increased, while substantially equal or higher volume density was obtained.

When a first-order differential distribution and a second-order differential distribution relating to the plurality of carbon particles herein were obtained, results illustrated in FIGS. 12 to 14 were obtained. FIG. 12 illustrates a first-order differential distribution and a second-order differential distribution relating to the experimental example 1-1. FIG. 13 illustrates a first-order differential distribution and a second-order differential distribution relating to the experimental example 2-4. FIG. 14 illustrates a first-order differential distribution and a second-order differential distribution relating to the experimental example 1-16. Details of a procedure of obtaining each of the first-order differential distributions and the second-order differential distributions are as described above. In FIGS. 12 to 14, a solid line indicates the first-order differential distribution (where a vertical axis indicates a first-order differential value dQ/dD),

TABLE 3

| | Kind | | | | | | Mixture Ratio (wt %) | | | | | |
|---|---|---|---|---|---|---|---|---|---|---|---|---|
| | Anode Active Material | | | | | | Anode Active Material | | | | | |
| Experimental Example | Carbon Particles (Large Particles) | Carbon Particles (Medium Particles) | Carbon Particles (Small Particles) | Non-Carbon Particles | Anode Conductor | Anode Binder | Carbon Particles (Large Particles) | Carbon Particles (Medium Particles) | Carbon Particles (Small Particles) | Non-Carbon Particles | Anode Conductor | Anode Binder |
| 2-1 | — | MCMB | Artificial Graphite | Si Oxide | CB + VGCF | PVDF | — | 85 | 1 | 5 | 1 + 3 | 5 |
| 2-2 | — | Natural Graphite | Artificial Graphite | Si Oxide | CB + VGCF | PVDF | — | 85 | 1 | 5 | 1 + 3 | 5 |
| 2-3 | MCMB | — | Artificial Graphite | Si Oxide | CB + VGCF | PVDF | 85 | — | 1 | 5 | 1 + 3 | 5 |
| 2-4 | MCMB | MCMB | — | Si Oxide | CB + VGCF | PVDF | 42.5 | 42.5 | — | 5 | 2 + 3 | 5 |
| 1-15 | — | MCMB | — | Si Oxide | CB + VGCF | PVDF | — | 85 | — | 5 | 2 + 3 | 5 |
| 1-16 | MCMB | — | — | Si Oxide | CB + VGCF | PVDF | 85 | — | — | 5 | 2 + 3 | 5 |
| 1-17 | — | MCMB | — | Si Alloy | CB + VGCF | PVDF + CMC | — | 70 | — | 20 | 2 + 3 | 3 + 2 |

TABLE 4

| Experimental Example | Average Particle Diameter (D50: μm) | | | | Specific Surface Area (m²/g) | | | | Carbon Ratio (wt %) | | | Non-carbon Ratio Z (wt %) | Volume Density (g/cm²) | Capacity Retention Ratio (%) |
|---|---|---|---|---|---|---|---|---|---|---|---|---|---|---|
| | P1 | P2 | P3 | V | Q1 | Q2 | Q3 | W | R1 | R2 | R3 | | | |
| 2-1 | — | 10 | 3.4 | 4.4 | — | 3.1 | 20 | 4.5 | — | 98.84 | 1.16 | 5.49 | 1.62 | 69 |
| 2-2 | — | 15 | 3.4 | 4.4 | — | 1.22 | 20 | 4.5 | — | 98.84 | 1.16 | 5.49 | 1.67 | 68 |
| 2-3 | 32 | — | 3.4 | 4.4 | 0.81 | — | 20 | 4.5 | 98.84 | — | 1.16 | 5.49 | 1.7 | 62 |
| 2-4 | 33 | 15 | — | 4.4 | 0.66 | 0.73 | — | 4.5 | 50 | 50 | — | 5.56 | 1.8 | 74 |
| 1-15 | — | 10 | — | 4.4 | — | 3.1 | — | 4.5 | — | 100 | — | 5.56 | 1.62 | 59 |
| 1-16 | 32 | — | — | 4.4 | 0.66 | — | — | 4.5 | 100 | — | — | 5.56 | 1.62 | 58 |
| 1-17 | — | 10 | — | 3.2 | — | 3.1 | — | 35 | — | 100 | — | 28.57 | 1.68 | 50 |

Even in a case in which two kinds of graphite particles were used as the plurality of carbon particles, results similar to those in the case in which three kinds of graphite particles and a broken line indicates the second-order differential distribution (where a vertical axis indicates a second-order differential value $d^2Q/dD^2$).

In the case in which the carbon particles contained three kinds of graphite particles (the experimental example 1-1), as illustrated in FIG. 12, two inflection points appeared in the first-order differential distribution. In this case, when the second-order differential distribution was examined, three minimal values P1 to P3 were obtained. However, the minimal values P1 and P2 of the minimal values P1 to P3 each were a positive value, and the minimal value P3 was a negative value. Accordingly, the first-order differential distribution illustrated in FIG. 12 had two discontinuities (points corresponding to the respective minimal values P1 and P2).

In the case in which the carbon particles contained two kinds of graphite particles (the experimental example 2-4), as illustrated in FIG. 13, one inflection point appeared in the first-order differential distribution. In this case, when the second-order differential distribution was examined, two minimal values P4 and P5 were obtained. However, the minimal value P4 of the minimal values P4 and P5 was a positive value, and the minimal value P5 was a negative value. Accordingly, the first-order differential distribution illustrated in FIG. 13 had one discontinuity (a point corresponding to the minimal value P4).

In the case in which the carbon particles contained one kind of graphite particles (the experimental example 1-16), as illustrated in FIG. 14, no inflection point appeared in the first-order differential distribution. In this case, when the second-order differential distribution was examined, one minimal value P6 was obtained. However, the minimal value P6 was a negative value. Accordingly, the first-order differential distribution illustrated in FIG. 14 did not have a discontinuity.

As can be seen from the results illustrated in Tables 1 to 4 and FIGS. 12 to 14, in a case in which the plurality of carbon particles containing graphite and the plurality of non-carbon particles containing the metal-based material were used, when the first-order differential distribution relating to the plurality of carbon particles had one or more discontinuities, the cycle characteristics were improved. Accordingly, superior battery characteristics were achieved.

Although the present technology has been described above referring to some embodiments and examples, the present technology is not limited thereto, and may be modified in a variety of ways.

For example, the description has been given with reference to examples in which the battery structure is of the cylindrical type, the laminated film type, and the coin type, and the battery element has the spirally wound structure. However, the battery structure and the battery element structure are not limited thereto. The secondary battery of the present technology is similarly applicable also to a case in which other battery structure such as that of a square type or a button type is employed. Moreover, the secondary battery of the present technology is similarly applicable also to a case in which the battery element has other structure such as a stacked structure.

Moreover, the electrode reactant may be any of other Group 1 elements such as sodium (Na) and potassium (K), Group 2 elements such as magnesium and calcium, and other light-metals such as aluminum. Since the effects of the present technology are expected to be achieved independently of the kind of the electrode reactant, similar effects are achievable, even if the kind of the electrode reactant is changed.

Further, the secondary battery-use active material and the secondary battery-use electrode of the present technology may be applicable to any applications other than the secondary battery. Examples of other applications may include a capacitor.

Note that the effects described in the present specification are illustrative and non-limiting. The technology may have effects other than those described in the present specification.

It is to be noted that the present technology may have the following configurations.

(1)

A secondary battery, including:

a cathode;

an anode (1) including a plurality of carbon particles and a plurality of non-carbon particles, (2) the carbon particles containing graphite, (3) the non-carbon particles containing a material including, as a constituent element, one or more of silicon (Si), tin (Sn), and germanium (Ge), and (4) a distribution of a first-order differential value of an integrated value Q of a relative particle amount with respect to a particle diameter D of the plurality of carbon particles having one or more discontinuities, where a horizontal axis and a vertical axis of the distribution indicate the particle diameter D (μm) and a first-order differential value dQ/dD, respectively; and an electrolyte.

(2)

The secondary battery according to (1), wherein the plurality of carbon particles contain a plurality of graphite particles of two or more kinds having different average particle diameters from each other (median diameters D50: μm).

(3)

The secondary battery according to (1) or (2), wherein the plurality of carbon particles contain a plurality of first graphite particles, a plurality of second graphite particles, and a plurality of third graphite particles, and an average particle diameter P1 (μm) of the plurality of first graphite particles, an average particle diameter P2 (μm) of the plurality of second graphite particles, and an average particle diameter P3 (μm) of the plurality of third graphite particles satisfy P1>P2>P3.

(4)

The secondary battery according to (3), wherein the average particle diameter P1 of the plurality of first graphite particles satisfies 20 μm≤P1≤40 μm, the average particle diameter P2 of the plurality of second graphite particles satisfies 10 μm≤P2≤25 μm, and the average particle diameter P3 of the plurality of third graphite particles satisfies 1 μm×P3≤8 μm.

(5)

The secondary battery according to (3) or (4), wherein a specific surface area Q1 of the plurality of first graphite particles satisfies 0.3 $m^2/g$≤Q1≤2 $m^2/g$, a specific surface area Q2 of the plurality of second graphite particles satisfies 0.3 $m^2/g$≤Q2≤4 $m^2/g$, and a specific surface area Q3 of the plurality of third graphite particles satisfies 2 $m^2/g$×Q3≤25 $m^2/g$.

(6)

The secondary battery according to any one of (3) to (5), wherein, in the plurality of first graphite particles, the plurality of second graphite particles, and the plurality of third graphite particles, a ratio R1 (wt %) of the first graphite particles, a ratio R2 (wt %) of the second graphite particles, and a ratio R3 (wt %) of the third graphite particles satisfy R1≥R2>R3.

(7)

The secondary battery according to (6), wherein the ratio R1 of the first graphite particles satisfies 40 wt %≤R1≤99 wt %, the ratio R2 of the second graphite particles satisfies 5 wt %≤R2≤60 wt %, and the ratio R3 of the third graphite particles satisfies 0.1 wt %≤R3≤20 wt %.

(8)

The secondary battery according to any one of (3) to (7), wherein the second graphite particles contain natural graphite.

(9)

The secondary battery according to (1) or (2), wherein the plurality of carbon particles contain a plurality of first graphite particles and a plurality of second graphite particles, and an average particle diameter S1 of the plurality of first graphite particles and an average particle diameter S2 of the plurality of second graphite particles satisfy S1>S2.

(10)

The secondary battery according to (9), wherein the average particle diameter S1 of the plurality of first graphite particles satisfies 20 μm≤S1≤40 μm, and the average particle diameter S2 of the plurality of second graphite particles satisfies 10 μm≤S2×25 μm, the average particle diameter S1 of the plurality of first graphite particles satisfies 20 μm≤S1≤40 μm, and the average particle diameter S2 of the plurality of second graphite particles satisfies 1 μm≤S2≤8 μm, or the average particle diameter S1 of the plurality of first graphite particles satisfies 10 μm≤S1≤25 μm, and the average particle diameter S2 of the plurality of second graphite particles satisfies 1 μm≤S258 μm.

(11)

The secondary battery according to (9) or (10), wherein a specific surface area T1 of the plurality of first graphite particles satisfies 0.3 m²/g≤T1≤2 m²/g, and a specific surface area T2 of the plurality of second graphite particles satisfies 0.3 m²/g≤T2≤4 m²/g, the specific surface area T1 of the plurality of first graphite particles satisfies 0.3 m²/g≤T1≤2 m²/g, and the specific surface area T2 of the plurality of second graphite particles satisfies 2 m²/g≤T2≤25 m²/g, or a specific surface area T1 of the plurality of first graphite particles satisfies 0.3 m²/g≤T1≤4 m²/g, and a specific surface area T2 of the plurality of second graphite particles satisfies 2 m²/g≤T2≤25 m²/g.

(12)

The secondary battery according to any one of (9) to (11), wherein, in the plurality of first graphite particles and the plurality of second graphite particles, a ratio U1 (wt %) of the first graphite particles and a ratio U2 (wt %) of the second graphite particles satisfy U1>U2.

(13)

The secondary battery according to (12), wherein the ratio U1 of the plurality of first graphite particles satisfies 0 wt %<U1≤99 wt %, and the ratio U2 of the second graphite particles satisfies 0 wt %<U2≤99 wt %, or the ratio U1 of the plurality of first graphite particles satisfies 0 wt %<U1≤99 wt %, and the ratio U2 of the second graphite particles satisfies 0 wt %<U2≤20 wt %.

(14)

The secondary battery according to any one of (1) to (13), wherein the non-carbon particles contain one or more of a simple substance of silicon, an alloy of silicon, and a compound of silicon.

(15)

The secondary battery according to any one of (1) to (14), wherein an average particle diameter (median diameter D50) V of the plurality of non-carbon particles satisfies 1 μm≤V≤10 μm, a specific surface area W of the plurality of non-carbon particles satisfies 2 m²/g≤W×100 m²/g, and in the plurality of carbon particles and the plurality of non-carbon particles, a ratio Z of the plurality of non-carbon particles satisfies 3 wt %≤Z≤30 wt %.

(16)

The secondary battery according to any one of (1) to (15), wherein the anode includes an anode active material layer, the anode active material layer contains the plurality of carbon particles and the plurality of non-carbon particles, and volume density of the anode active material layer is 1.7 g/cm³ or more.

(17)

The secondary battery according to any one of (1) to (16), wherein the secondary battery is a lithium-ion secondary battery.

(18)

A secondary battery-use electrode, including:

(1) a plurality of carbon particles and a plurality of non-carbon particles, (2) the carbon particles containing graphite, (3) the non-carbon particles containing a material including, as a constituent element, one or more of silicon (Si), tin (Sn), and germanium (Ge), and (4) a distribution of a first-order differential value of an integrated value Q of a relative particle amount with respect to a particle diameter D of the plurality of carbon particles having one or more discontinuities, where a horizontal axis and a vertical axis of the distribution indicate the particle diameter D (μm) and a first-order differential value dQ/dD, respectively.

(19)

A secondary battery-use active material, including:

(1) a plurality of carbon particles and a plurality of non-carbon particles, (2) the carbon particles containing graphite, (3) the non-carbon particles containing a material including, as a constituent element, one or more of silicon (Si), tin (Sn), and germanium (Ge), and (4) a distribution of a first-order differential value of an integrated value Q of a relative particle amount with respect to a particle diameter D of the plurality of carbon particles having one or more discontinuities, where a horizontal axis and a vertical axis of the distribution indicate the particle diameter D (μm) and a first-order differential value dQ/dD, respectively.

(20)

A battery pack including:

the secondary battery according to any one of (1) to (17);

a controller that controls an operation of the secondary battery; and a switch section that switches the operation of the secondary battery in accordance with an instruction from the controller.

(21)

An electric vehicle including:

the secondary battery according to any one of (1) to (17);

a converter that converts electric power supplied from the secondary battery into drive power;

a drive section that operates in accordance with the drive power; and a controller that controls an operation of the secondary battery.

(22)
An electric power storage system including:
the secondary battery according to any one of (1) to (17);
one or more electric devices that are supplied with electric power from the secondary battery; and
a controller that controls the supplying of the electric power from the secondary battery to the one or more electric devices.
(23)
An electric power tool including:
the secondary battery according to any one of (1) to (17); and
a movable section that is supplied with electric power from the secondary battery.
(24)
An electronic apparatus including the secondary battery according to any one of (1) to (17) as an electric power supply source.

The present application is based on and claims priority from Japanese Patent Application No. 2014-240108 filed in the Japan Patent Office on Nov. 27, 2014, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:
1. A secondary battery, comprising:
a cathode;
an anode including a plurality of carbon particles and a plurality of non-carbon particles, the plurality of carbon particles containing graphite, the plurality of non-carbon particles containing a material including, as a constituent element, one or more of silicon (Si), tin (Sn), and germanium (Ge), wherein
a distribution of a first-order differential value of an integrated value Q of a relative particle amount of the plurality of carbon particles with respect to a particle diameter D of the plurality of carbon particles has one or more discontinuities,
a horizontal axis and a vertical axis of the distribution indicate the particle diameter D (μm) and the first-order differential value dQ/dD, respectively,
the plurality of carbon particles contains a plurality of first graphite particles, a plurality of second graphite particles, and a plurality of third graphite particles,
an average particle diameter P1 (μm) of the plurality of first graphite particles, an average particle diameter P2 (μm) of the plurality of second graphite particles, and an average particle diameter P3 (μm) of the plurality of third graphite particles satisfy P1>P2>P3,
the average particle diameter P1 of the plurality of first graphite particles satisfies 20 μm≤P1≤40 μm,
the average particle diameter P2 of the plurality of second graphite particles satisfies 10 μm≤P2≤25 μm, and
the average particle diameter P3 of the plurality of third graphite particles satisfies 1 μm≤P3≤8 μm; and
an electrolyte.
2. The secondary battery according to claim 1, wherein
a specific surface area Q1 of the plurality of first graphite particles satisfies 0.3 m$^2$/g≤Q1≤2 m$^2$/g,
a specific surface area Q2 of the plurality of second graphite particles satisfies 0.3 m$^2$/g≤Q2≤4 m$^2$/g, and
a specific surface area Q3 of the plurality of third graphite particles satisfies 2 m$^2$/g≤Q3≤25 m$^2$/g.
3. The secondary battery according to claim 1, wherein, in the plurality of first graphite particles, the plurality of second graphite particles, and the plurality of third graphite particles, a ratio R1 (wt %) of the first graphite particles, a ratio R2 (wt %) of the second graphite particles, and a ratio R3 (wt %) of the third graphite particles satisfy R1≥R2>R3.
4. The secondary battery according to claim 3, wherein
the ratio R1 of the first graphite particles satisfies 40 wt %≤R1≤99 wt %,
the ratio R2 of the second graphite particles satisfies 5 wt %≤R2≤60 wt %, and
the ratio R3 of the third graphite particles satisfies 0.1 wt %≤R3≤20 wt %.
5. The secondary battery according to claim 1, wherein the plurality of second graphite particles contains natural graphite.
6. The secondary battery according to claim 1, wherein the plurality of non-carbon particles contains one or more of a simple substance of silicon, an alloy of silicon, and a compound of silicon.
7. The secondary battery according to claim 1, wherein
an average particle diameter (median diameter D50) V of the plurality of non-carbon particles satisfies 1 μm≤V≤10 μm,
a specific surface area W of the plurality of non-carbon particles satisfies 2 m$^2$/g≤W≤100 m$^2$/g, and
in the plurality of carbon particles and the plurality of non-carbon particles, a ratio Z of the plurality of non-carbon particles to the plurality of carbon particles satisfies 3 wt %≤Z≤30 wt %.
8. The secondary battery according to claim 1, wherein
the anode includes an anode active material layer,
the anode active material layer contains the plurality of carbon particles and the plurality of non-carbon particles, and
volume density of the anode active material layer is 1.7 g/cm$^3$ or more.
9. A secondary battery-use electrode, comprising:
a plurality of carbon particles and a plurality of non-carbon particles, the plurality of carbon particles containing graphite, the plurality of non-carbon particles containing a material including, as a constituent element, one or more of silicon (Si), tin (Sn), and germanium (Ge), wherein
a distribution of a first-order differential value of an integrated value Q of a relative particle amount of the plurality of carbon particles with respect to a particle diameter D of the plurality of carbon particles has one or more discontinuities,
a horizontal axis and a vertical axis of the distribution indicate the particle diameter D (μm) and the first-order differential value dQ/dD, respectively,
the plurality of carbon particles contains a plurality of first graphite particles, a plurality of second graphite particles, and a plurality of third graphite particles,
an average particle diameter P1 (μm) of the plurality of first graphite particles, an average particle diameter P2 (μm) of the plurality of second graphite particles, and an average particle diameter P3 (μm) of the plurality of third graphite particles satisfy P1>P2>P3,
the average particle diameter P1 of the plurality of first graphite particles satisfies 20 μm≤P1≤40 μm, the average particle diameter P2 of the plurality of second graphite particles satisfies 10 μm≤P2≤25 μm, and the average particle diameter P3 of the plurality of third graphite particles satisfies 1 μm≤P3≤8 μm.

10. A secondary battery-use active material, comprising:
a plurality of carbon particles and a plurality of non-carbon particles, the plurality of carbon particles containing graphite, the plurality of non-carbon particles containing a material including, as a constituent element, one or more of silicon (Si), tin (Sn), and germanium (Ge), wherein a distribution of a first-order differential value of an integrated value Q of a relative particle amount of the plurality of carbon particles with respect to a particle diameter D of the plurality of carbon particles has one or more discontinuities, a horizontal axis and a vertical axis of the distribution indicate the particle diameter D (μm) and the first-order differential value dQ/dD, respectively, the plurality of carbon particles contains a plurality of first graphite particles, a plurality of second graphite particles, and a plurality of third graphite particles, an average particle diameter P1 (μm) of the plurality of first graphite particles, an average particle diameter P2 (μm) of the plurality of second graphite particles, and an average particle diameter P3 (μm) of the plurality of third graphite particles satisfy P1>P2>P3, the average particle diameter P1 of the plurality of first graphite particles satisfies 20 μm≤P1≤40 μm, the average particle diameter P2 of the plurality of second graphite particles satisfies 10 μm≤P2≤25 μm, and the average particle diameter P3 of the plurality of third graphite particles satisfies 1 μm≤P3≤8 μm.

11. An electric vehicle, comprising:
a secondary battery;
a converter that converts electric power supplied from the secondary battery into drive power;
a drive section that operates in accordance with the drive power; and
a controller that controls an operation of the secondary battery,
the secondary battery including a cathode, an anode, and an electrolyte,
the anode including a plurality of carbon particles and a plurality of non-carbon particles, the plurality of carbon particles containing graphite, the plurality of non-carbon particles containing a material including, as a constituent element, one or more of silicon (Si), tin (Sn), and germanium (Ge), wherein a distribution of a first-order differential value of an integrated value Q of a relative particle amount of the plurality of carbon particles with respect to a particle diameter D of the plurality of carbon particles has one or more discontinuities, a horizontal axis and a vertical axis of the distribution indicate the particle diameter D (μm) and the first-order differential value dQ/dD, respectively, the plurality of carbon particles contains a plurality of first graphite particles, a plurality of second graphite particles, and a plurality of third graphite particles, an average particle diameter P1 (μm) of the plurality of first graphite particles, an average particle diameter P2 (μm) of the plurality of second graphite particles, and an average particle diameter P3 (μm) of the plurality of third graphite particles satisfy P1>P2>P3, the average particle diameter P1 of the plurality of first graphite particles satisfies 20 μm≤P1≤40 μm, the average particle diameter P2 of the plurality of second graphite particles satisfies 10 μm≤P2≤25 μm, and the average particle diameter P3 of the plurality of third graphite particles satisfies 1 μm≤P3≤8 μm.

12. An electronic apparatus, comprising:
a secondary battery as an electric power supply source, the secondary battery including a cathode, an anode, and an electrolyte,
the anode including a plurality of carbon particles and a plurality of non-carbon particles, the plurality of carbon particles containing graphite, the plurality of non-carbon particles containing a material including, as a constituent element, one or more of silicon (Si), tin (Sn), and germanium (Ge), wherein a distribution of a first-order differential value of an integrated value Q of a relative particle amount of the plurality of carbon particles with respect to a particle diameter D of the plurality of carbon particles has one or more discontinuities, a horizontal axis and a vertical axis of the distribution indicate the particle diameter D (μm) and the first-order differential value dQ/dD, respectively, the plurality of carbon particles contains a plurality of first graphite particles, a plurality of second graphite particles, and a plurality of third graphite particles, an average particle diameter P1 (μm) of the plurality of first graphite particles, an average particle diameter P2 (μm) of the plurality of second graphite particles, and an average particle diameter P3 (μm) of the plurality of third graphite particles satisfy P1>P2>P3, the average particle diameter P1 of the plurality of first graphite particles satisfies 20 μm≤P1≤40 μm, the average particle diameter P2 of the plurality of second graphite particles satisfies 10 μm≤P2≤25 μm, and the average particle diameter P3 of the plurality of third graphite particles satisfies 1 μm≤P3≤8 μm.

* * * * *